(12) United States Patent
Kassner et al.

(10) Patent No.: US 11,537,202 B2
(45) Date of Patent: Dec. 27, 2022

(54) METHODS FOR GENERATING CALIBRATION DATA FOR HEAD-WEARABLE DEVICES AND EYE TRACKING SYSTEM

(71) Applicant: Pupil Labs GmbH, Berlin (DE)

(72) Inventors: Moritz Kassner, Berlin (DE); Marc Tonsen, Berlin (DE); Kai Dierkes, Berlin (DE)

(73) Assignee: Pupil Labs GmbH, Berlin (DE)

( * ) Notice: Subject to any disclaimer, the term of this patent is extended or adjusted under 35 U.S.C. 154(b) by 0 days.

(21) Appl. No.: 17/423,324

(22) PCT Filed: Jan. 16, 2019

(86) PCT No.: PCT/EP2019/051057
§ 371 (c)(1),
(2) Date: Jul. 15, 2021

(87) PCT Pub. No.: WO2020/147948
PCT Pub. Date: Jul. 23, 2020

(65) Prior Publication Data
US 2022/0083134 A1 Mar. 17, 2022

(51) Int. Cl.
*G06F 3/01* (2006.01)
*G06F 13/38* (2006.01)

(52) U.S. Cl.
CPC ............ *G06F 3/013* (2013.01); *G06F 13/382* (2013.01); *G06F 2213/0042* (2013.01)

(58) Field of Classification Search
CPC . G06F 3/013; G06F 13/382; G06F 2213/0042
See application file for complete search history.

(56) References Cited

U.S. PATENT DOCUMENTS

| 4,852,988 A | 8/1989 | Velez et al. |
| 6,091,546 A | 7/2000 | Spitzer |

(Continued)

FOREIGN PATENT DOCUMENTS

| CA | 2967756 | 10/2005 |
| CA | 2750287 | 11/2011 |

(Continued)

OTHER PUBLICATIONS

Moritz Kassner, Will Patera, Andreas Bulling: "Pupil: An Open Source Platform for Pervasive Eye Tracking and Mobile Gaze-based Interaction", Proceedings of the 2014 ACM International Joint Conference on Pervasive and Ubiquitous Computing: Adjunct Publication, pp. 1151-1160, ACM Sep. 13-17, 2014.

(Continued)

*Primary Examiner* — Mihir K Rayan
(74) *Attorney, Agent, or Firm* — Dicke, Billig & Czaja, PLLC

(57) ABSTRACT

A system and method for generating data suitable for calibrating a head-wearable device is disclosed. In one example the device includes a first eye camera and a scene camera. The first eye camera is used to generate first images of at least a portion of a first eye of the user while the user is expected to look at the object and mimic the not translatory movement. Respective positions of the object in the field images are determined. The determined positions of the object are used to determine the first images respective ground truth values of at least one gaze-direction related parameter of the user.

20 Claims, 10 Drawing Sheets

(56) References Cited

U.S. PATENT DOCUMENTS

| | | | |
|---|---|---|---|
| 6,351,273 B1 | 2/2002 | Lemelson et al. | |
| 6,943,754 B2 | 9/2005 | Aughey et al. | |
| 7,488,294 B2 | 2/2009 | Torch | |
| 8,342,687 B2* | 1/2013 | Blixt | G03B 15/16 351/209 |
| 8,594,374 B1 | 11/2013 | Bozarth | |
| 8,624,994 B2 | 1/2014 | Kaneda et al. | |
| 8,752,963 B2 | 6/2014 | McCulloch et al. | |
| 8,761,459 B2 | 6/2014 | Kaneda et al. | |
| 8,885,877 B2* | 11/2014 | Publicover | G06V 40/19 382/103 |
| 8,982,046 B2 | 3/2015 | Edwards et al. | |
| 9,185,352 B1 | 11/2015 | Jacques | |
| 9,189,095 B2 | 11/2015 | Eden et al. | |
| 9,207,760 B1 | 12/2015 | Wu et al. | |
| 9,529,442 B2 | 12/2016 | Cho et al. | |
| 9,600,069 B2 | 3/2017 | Publicover et al. | |
| 9,668,648 B2 | 6/2017 | Pfleger et al. | |
| 9,693,684 B2 | 7/2017 | Lopez et al. | |
| 9,727,136 B2 | 8/2017 | Willairat et al. | |
| 9,737,209 B2 | 8/2017 | Gramatikov et al. | |
| 9,785,233 B2 | 10/2017 | San Agustin Lopez et al. | |
| 9,811,158 B2 | 11/2017 | Hennessey et al. | |
| 9,936,195 B2 | 4/2018 | Horesh | |
| 9,958,941 B2 | 5/2018 | Gustafsson et al. | |
| 9,961,307 B1 | 5/2018 | Weinblatt | |
| 9,977,960 B2 | 5/2018 | Gustafsson et al. | |
| 10,016,131 B2 | 7/2018 | Liu et al. | |
| 10,048,749 B2 | 8/2018 | Miao et al. | |
| 10,114,459 B2 | 10/2018 | Algotsson et al. | |
| 10,157,313 B1 | 12/2018 | Zhang et al. | |
| 10,307,053 B2 | 6/2019 | Fayolle | |
| 10,416,764 B2 | 9/2019 | Wanner et al. | |
| 10,452,137 B2 | 10/2019 | Noda et al. | |
| 10,488,668 B2 | 11/2019 | Cazalet | |
| 10,496,160 B2 | 12/2019 | Lu et al. | |
| 10,514,542 B2 | 12/2019 | Erinjippurath et al. | |
| 10,546,193 B2 | 1/2020 | Schmidt et al. | |
| 10,976,813 B2 | 4/2021 | Nistico et al. | |
| 11,023,038 B2 | 6/2021 | Yasuda et al. | |
| 2004/0174496 A1 | 9/2004 | Ji et al. | |
| 2005/0225723 A1 | 10/2005 | Pilu | |
| 2006/0240005 A1 | 10/2006 | Velardi | |
| 2007/0066916 A1 | 3/2007 | Lemos | |
| 2010/0045933 A1 | 2/2010 | Eberl et al. | |
| 2010/0053555 A1 | 3/2010 | Enriquez et al. | |
| 2011/0254865 A1* | 10/2011 | Yee | G06F 3/04886 345/661 |
| 2012/0212593 A1 | 8/2012 | Na'aman et al. | |
| 2012/0290401 A1 | 11/2012 | Neven | |
| 2012/0293773 A1* | 11/2012 | Publicover | A61B 3/0008 351/210 |
| 2013/0050070 A1 | 2/2013 | Lewis et al. | |
| 2013/0069883 A1 | 3/2013 | Oga | |
| 2013/0100025 A1 | 4/2013 | Vernacchia | |
| 2014/0022371 A1 | 1/2014 | Huang et al. | |
| 2014/0049452 A1 | 2/2014 | Maltz | |
| 2014/0055591 A1 | 2/2014 | Katz | |
| 2014/0055747 A1 | 2/2014 | Nistico et al. | |
| 2014/0152558 A1 | 6/2014 | Salter et al. | |
| 2014/0191927 A1 | 7/2014 | Cho | |
| 2014/0218281 A1 | 8/2014 | Amayeh et al. | |
| 2014/0226131 A1* | 8/2014 | Lopez | G06F 21/36 351/210 |
| 2014/0247232 A1 | 9/2014 | George-Svahn et al. | |
| 2014/0285404 A1 | 9/2014 | Takano et al. | |
| 2014/0354953 A1 | 12/2014 | Chen et al. | |
| 2015/0070470 A1 | 3/2015 | McMurrough | |
| 2015/0085251 A1 | 3/2015 | Larsen | |
| 2015/0169050 A1 | 6/2015 | Publicover et al. | |
| 2015/0181100 A1 | 6/2015 | Publicover et al. | |
| 2015/0302585 A1 | 10/2015 | VanBlon et al. | |
| 2015/0310263 A1 | 10/2015 | Zhang et al. | |
| 2016/0004306 A1 | 1/2016 | Maltz | |
| 2016/0005176 A1 | 1/2016 | Nguyen et al. | |
| 2016/0011658 A1 | 1/2016 | Lopez et al. | |
| 2016/0029883 A1* | 2/2016 | Cox | G06V 40/19 351/209 |
| 2016/0109945 A1 | 4/2016 | Kempinski | |
| 2016/0134863 A1* | 5/2016 | Horesh | H04N 17/002 348/78 |
| 2016/0166146 A1 | 6/2016 | Sarkar | |
| 2016/0166190 A1* | 6/2016 | Publicover | A61B 5/1103 351/210 |
| 2016/0187969 A1 | 6/2016 | Larsen et al. | |
| 2016/0202756 A1 | 7/2016 | Wu et al. | |
| 2016/0206196 A1 | 7/2016 | Pfleger et al. | |
| 2016/0252751 A1 | 9/2016 | Kim | |
| 2016/0262608 A1 | 9/2016 | Krueger | |
| 2016/0267708 A1 | 9/2016 | Nistico et al. | |
| 2016/0328016 A1 | 11/2016 | Andersson et al. | |
| 2017/0004363 A1 | 1/2017 | Dore et al. | |
| 2017/0017299 A1 | 1/2017 | Biedert et al. | |
| 2017/0031437 A1 | 2/2017 | Qian et al. | |
| 2017/0035293 A1 | 2/2017 | Nistico et al. | |
| 2017/0116476 A1 | 4/2017 | Publicover et al. | |
| 2017/0123491 A1 | 5/2017 | Hansen | |
| 2017/0188823 A1 | 7/2017 | Ganesan et al. | |
| 2017/0243387 A1 | 8/2017 | Li et al. | |
| 2017/0276934 A1 | 9/2017 | Sarkar | |
| 2017/0308734 A1 | 10/2017 | Chalom et al. | |
| 2017/0332901 A1 | 11/2017 | Hwang et al. | |
| 2017/0351326 A1 | 12/2017 | Aarts et al. | |
| 2017/0372487 A1 | 12/2017 | Lagun et al. | |
| 2018/0018451 A1 | 1/2018 | Spizhevoy et al. | |
| 2018/0032131 A1 | 2/2018 | Yasuda et al. | |
| 2018/0059782 A1 | 3/2018 | San Agustin et al. | |
| 2018/0089834 A1 | 3/2018 | Spizhevoy et al. | |
| 2018/0095295 A1 | 4/2018 | Chene et al. | |
| 2018/0103194 A1 | 4/2018 | Tang | |
| 2018/0137358 A1 | 5/2018 | Rousseau et al. | |
| 2018/0157892 A1 | 6/2018 | Han et al. | |
| 2018/0181809 A1 | 6/2018 | Ranjan et al. | |
| 2019/0043216 A1 | 2/2019 | Yabuuchi et al. | |
| 2019/0080474 A1 | 3/2019 | Lagun et al. | |
| 2019/0087973 A1 | 3/2019 | Kaehler et al. | |
| 2019/0156100 A1 | 5/2019 | Rougeaux et al. | |
| 2019/0265788 A1 | 8/2019 | Yosha et al. | |
| 2020/0183190 A1 | 6/2020 | Rousseau et al. | |

FOREIGN PATENT DOCUMENTS

| | | |
|---|---|---|
| CN | 102930252 | 2/2013 |
| CN | 103356163 | 10/2013 |
| CN | 106599994 | 4/2017 |
| CN | 107545302 | 1/2018 |
| DE | 19807902 | 9/1999 |
| DE | 10 2010 018 562 | 10/2011 |
| DE | 10 2016 210 288 | 12/2017 |
| EP | 1403680 | 3/2004 |
| EP | 1755441 | 2/2007 |
| EP | 1027627 | 2/2009 |
| EP | 2096577 | 9/2009 |
| EP | 2309307 | 4/2011 |
| EP | 2416280 | 2/2012 |
| EP | 2490155 | 8/2012 |
| EP | 2573650 | 3/2013 |
| EP | 2784632 | 10/2014 |
| EP | 2886041 | 6/2015 |
| EP | 2795888 | 9/2015 |
| EP | 2940555 | 11/2015 |
| EP | 2943835 | 11/2015 |
| EP | 2956844 | 12/2015 |
| EP | 3005030 | 4/2016 |
| EP | 3112922 | 1/2017 |
| EP | 3129849 | 2/2017 |
| EP | 3135464 | 3/2017 |
| EP | 3236338 | 10/2017 |
| EP | 3258308 | 12/2017 |
| EP | 3267295 | 2/2018 |
| EP | 3376163 | 9/2018 |
| TW | M401786 | 4/2011 |
| WO | 9905988 | 2/1999 |

(56) References Cited

FOREIGN PATENT DOCUMENTS

| | | |
|---|---|---|
| WO | 9926126 | 5/1999 |
| WO | 2005009466 | 2/2005 |
| WO | 2005094667 | 10/2005 |
| WO | 2009043927 | 4/2009 |
| WO | 2010071928 | 7/2010 |
| WO | 2012052061 | 4/2012 |
| WO | 2013059940 | 5/2013 |
| WO | 2013067230 | 5/2013 |
| WO | 2014085789 | 6/2014 |
| WO | 2014186620 | 11/2014 |
| WO | 2015024031 | 2/2015 |
| WO | 2015/179253 | 11/2015 |
| WO | 2016025583 | 2/2016 |
| WO | 2016074861 | 5/2016 |
| WO | 2016078911 | 5/2016 |
| WO | 2016097919 | 6/2016 |
| WO | 2016111880 | 7/2016 |
| WO | 2016146486 | 9/2016 |
| WO | 2016146488 | 9/2016 |
| WO | 2017001146 | 1/2017 |
| WO | 2017025486 | 2/2017 |
| WO | 2017027352 | 2/2017 |
| WO | 2017053966 | 3/2017 |
| WO | 2017053971 | 3/2017 |
| WO | 2017053972 | 3/2017 |
| WO | 2017053974 | 3/2017 |
| WO | 2017/216118 | 12/2017 |
| WO | 2018000020 | 1/2018 |
| WO | 2018063451 | 4/2018 |
| WO | 2018149875 | 8/2018 |

OTHER PUBLICATIONS

Marc Tonsen, Andreas Bulling et al: "InvisibleEye: Mobile Eye Tracking Using Multiple Low-Resolution Cameras and Learning-Based Gaze Estimation", Proceedings of the ACM on Interactive, Mobile, Wearable and Ubiquitous Technologies, vol. 1, No. 3, Article 106, Sep. 2017.

Mayberry, Addison, et al. "iShadow: design of a wearable, real-time mobile gaze tracker." Proceedings of the 12th annual international conference on Mobile systems, applications, and services, p. 82-94, ACM, 2014.

Mayberry PhD thesis, Leveraging Eye Structure and Motion to Build a Low-Power Wearable Gaze Tracking System, Oct. 2018.

Ishiguro, Yoshio, et al. "Aided eyes: eye activity sensing for daily life." Proceedings of the 1st Augmented Human International Conference. ACM, 2010.

Fuhl, Wolfgang, et al. "PupilNet: convolutional neural networks for robust pupil detection." arXiv preprint arXiv:1601.04902 (2016).

Baluja, Shumeet, and Dean Pomerleau. "Non-intrusive gaze tracking using artificial neural networks." Advances in Neural Information Processing Systems. 1994.

Pomplun et al. "An artificial neural network for high precision eye movement tracking", Advances in Artificial Intelligence, vol. 861 of the series Lecture Notes in Computer Science, pp. 63-69. 2005.

Zhang, Xucong, et al. "Appearance-based gaze estimation in the wild." Proceedings of the IEEE Conference on Computer Vision and Pattern Recognition. 2015.

Zhang, Xucong, et al. "It's written all over your face: Full-face appearance-based gaze estimation." Computer Vision and Pattern Recognition Workshops (CVPRW), 2017 IEEE Conference on. IEEE, 2017.

Feng Lu, Yusuke Sugano, Takahiro Okabe, and Yoichi Sato: "Adaptive Linear Regression for Appearance-Based Gaze Estimation", IEEE transactions on pattern analysis and machine intelligence (TPAMI) 36, 10 (2014), 2033-2046.

Cihan Topal, Serkan Gunal, Onur Koçdeviren, Atakan Doğan, and Ömer N Gerek: "A Low-Computational Approach on Gaze Estimation With Eye Touch System", IEEE transactions on Cybernetics 44, 2 (2013), 228-239.

Krafka, et al. "Eye tracking for everyone." IEEE Conference on Computer Vision and Pattern Recognition (CVPR), pp. 2176-2184, 2016.

Sugano, Bulling: "Self-calibrating head-mounted eye trackers using egocentric visual saliency." In Proc. ACM Symposium on User Interface Software and Technology (UIST 2015). 363-372.

Huang, Veeraraghavan, Sabharwal: "TabletGaze: Unconstrained appearance-based gaze estimation in mobile tablets" Jul. 16, 2016.

Hickson et al., "Eyemotion: Classifying facial expressions in VR using eye-tracking cameras", arXiv:1707.07204v2 [cs.CV] Jul. 28, 2017.

Anjith George, Aurobinda Routray: "Real-time Eye Gaze Direction Classification Using Convolutional Neural Network", IEEE InternationalConference on Signal Processing and Communication, SPCOM 2016.

Olszewski, K., Lim, J., Saito, S., Li, H.: "High-Fidelity Facial and Speech Animation for VR HMDs". ACM Trans. Graph.35, 6, Article 221 (Nov. 2016).

"Pogocam", Youtube, Jan. 6, 2017, URL: https://www.youtube.com/watc67v=pHumrhlSYx4.

Santini, Fuhl, Kasneci: "CalibMe: Fast and Unsupervised Eye Tracker Calibration for Gaze-Based Pervasive Human-Computer Interaction", Proc. CHI 2017, May 6-11, 2017.

Bace, Staal, Sörös: "Wearable Eye Tracker Calibration at Your Fingertips", Proc. ETRA 2018, Jun. 14-17, 2018, Warsaw/Poland.

* cited by examiner

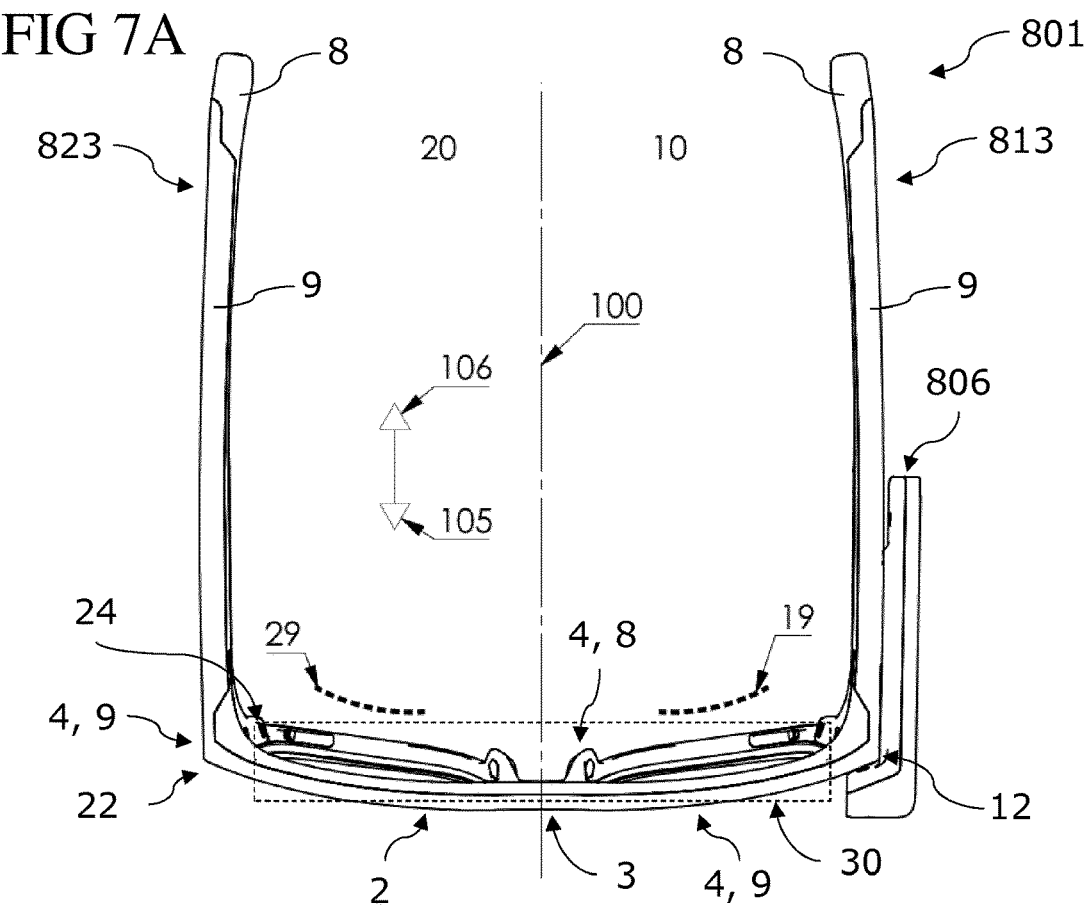
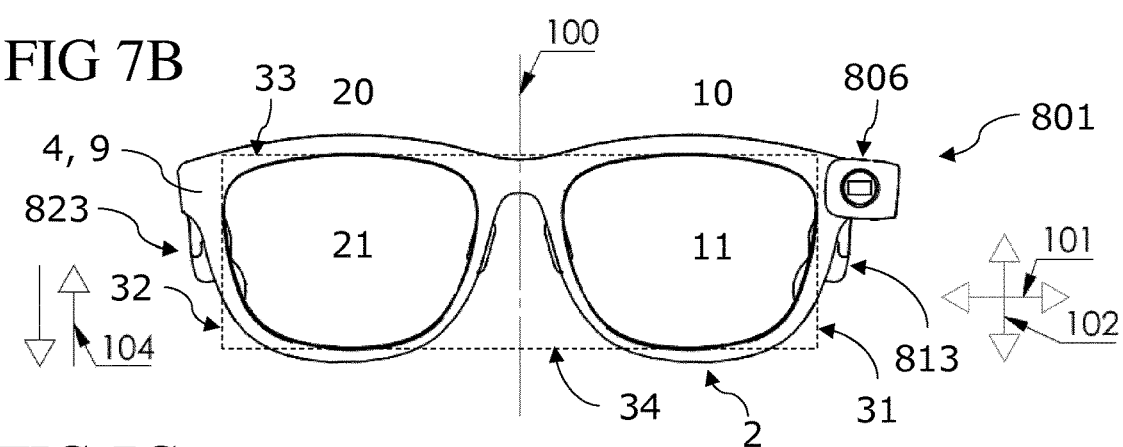
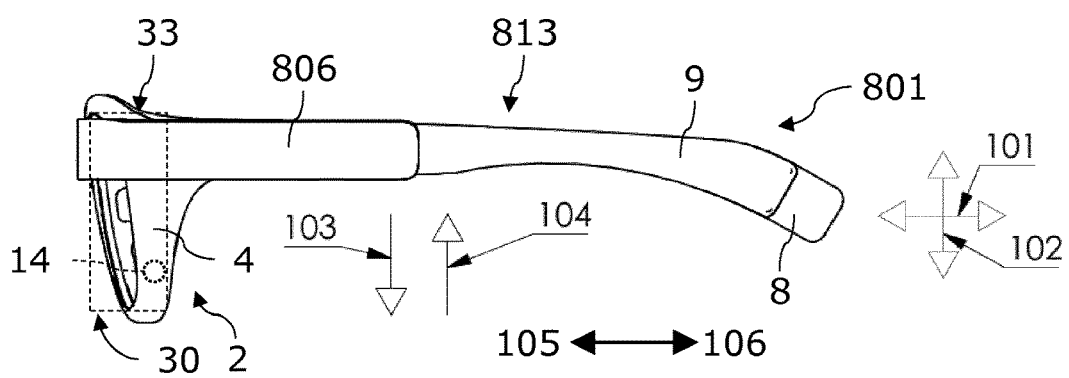

FIG 9A
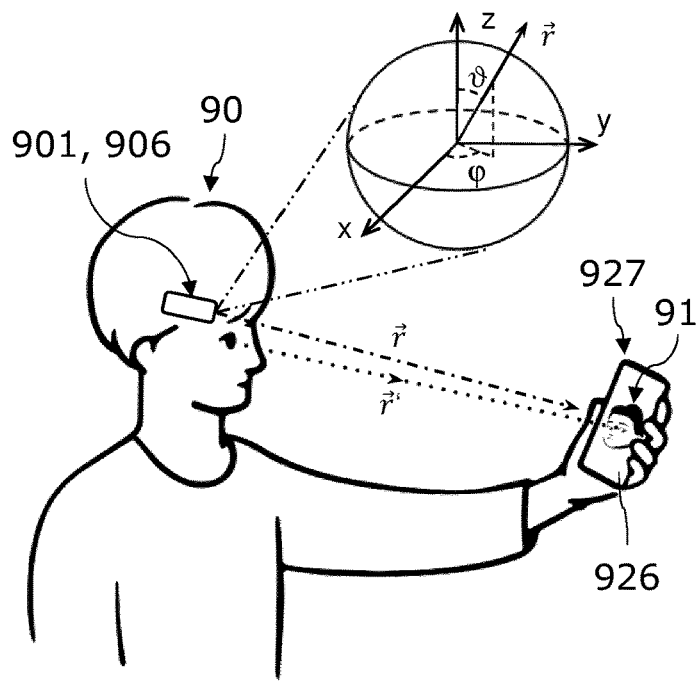
FIG 9C
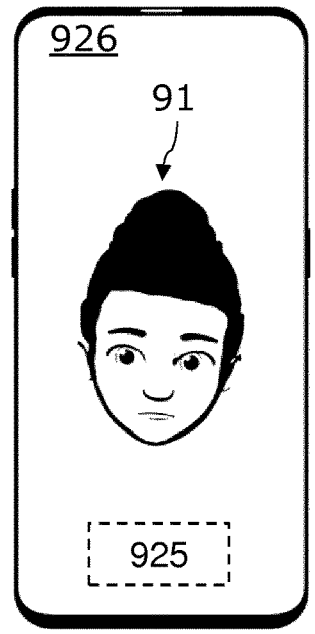
$(\alpha_{t2}", \beta_{t2}", \gamma_{t2}")$
FIG 9B
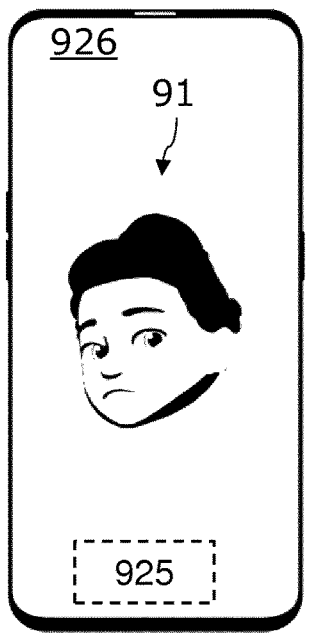
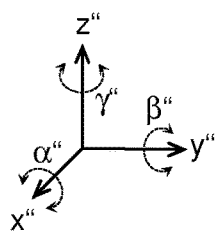
$(\alpha_{t1}", \beta_{t1}", \gamma_{t1}")$
FIG 9D
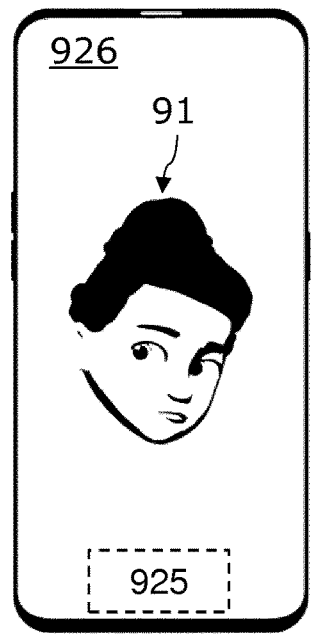
$(\alpha_{t3}", \beta_{t3}", \gamma_{t3}")$

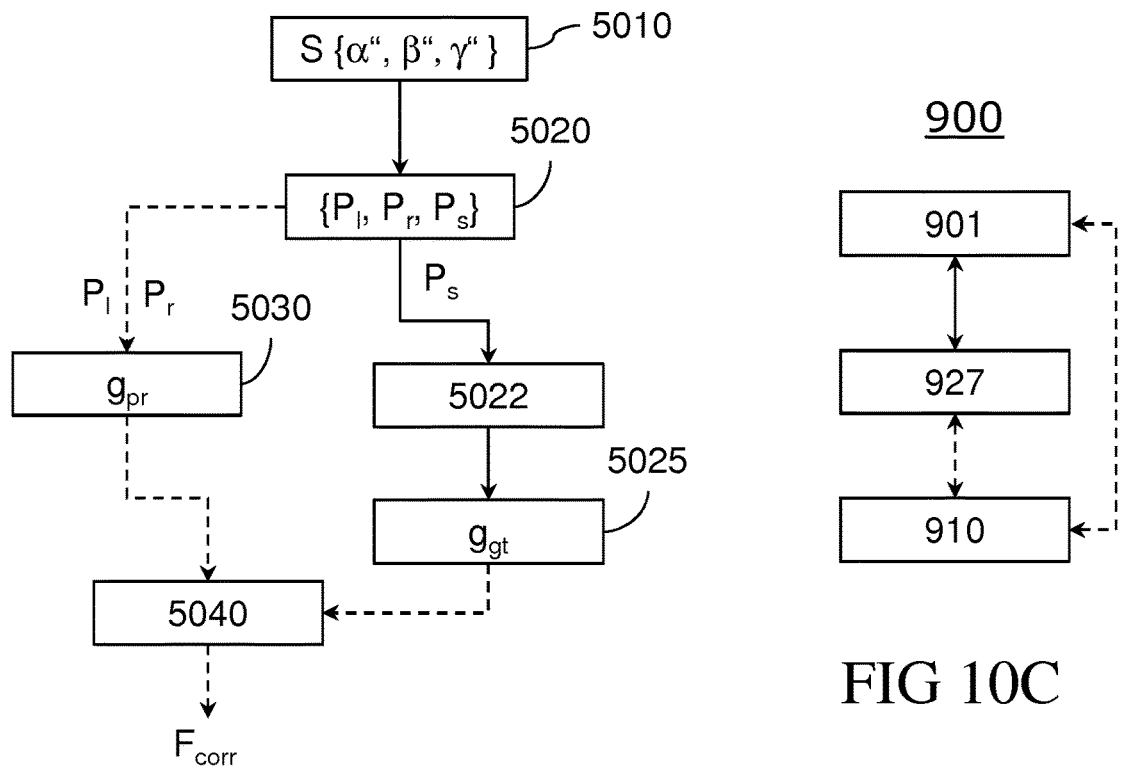
FIG 10A
FIG 10C
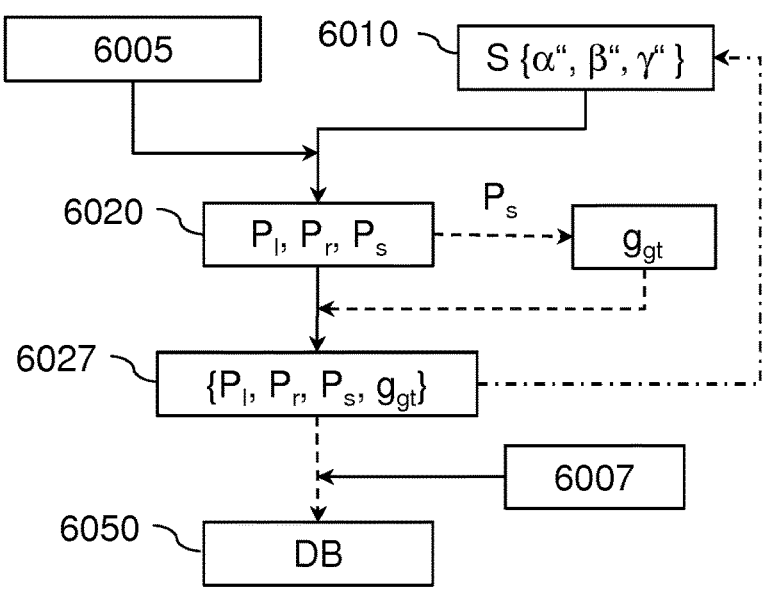
FIG 10B

METHODS FOR GENERATING CALIBRATION DATA FOR HEAD-WEARABLE DEVICES AND EYE TRACKING SYSTEM

CROSS-REFERENCE TO RELATED APPLICATIONS

This Utility Patent application claims priority under 35 U.S.C. § 371 to International Application Serial No. PCT/EP2019/051057 filed Jan. 16, 2019, which is incorporated herein by reference in its entirety.

TECHNICAL FIELD

Embodiments of the present invention relate to methods for generating data suitable for calibrating a head-wearable device such as a head-wearable spectacles device that may be used to detect one or more gaze-related parameters of a user, and an eye tracking system including a head-wearable device.

BACKGROUND

Calibration is an important step for all eye trackers, in particular head-mounted eye trackers. During calibration person-specific parameters of a general gaze prediction model may be fitted to a particular user. Some parameters of the human eye are not observable from the outside (like the exact location of the fovea in the eye giving rise to a difference in the optical and visual axis of the eye) and have to be inferred from observing the user's eyes while gazing at known (ground truth) positions. Therefore, calibration typically includes collecting pairs of eye images and ground truth gaze positions.

The most common calibration procedure for eye trackers is to display a series of standardized gaze targets on a screen and to instruct the user to gaze upon the targets. The ground truth gaze position can then be encoded as the positions of the gaze target on that screen or as the positions of the gaze target within a scene camera image (e.g. a camera carried by the user recording an ego-centric view). In the latter case image processing algorithms may detect the positions of the targets in the scene camera images. This procedure has the disadvantage of requiring a dedicated large display, making it impossible to perform the calibration in an arbitrary environment "in the field". The procedure also carries the risk that the users misunderstand the instructions and move their head instead of only their eyes to gaze at the targets displayed, thus only calibrating "straight ahead" gaze angles.

Alternatively, a real gaze target may be moved by an operator in front of the user. This gaze target can be a printout of a standardized pattern/shape which can be detected in the scene camera images to obtain ground truth gaze positions. This procedure can be executed everywhere, but it requires a trained operator to move the gaze target appropriately and a physical gaze target.

In another alternative, the user is holding one of their fingers straight at arms-length in front of them while gazing at the fingertip. They then move their head in an appropriate pattern while keeping the gaze on the fingertip. The fingertip may be detected in the scene camera images as gaze target. This procedure can also be executed everywhere, but it requires a trained user who is capable of moving the head appropriately. Typically, users participating in eye tracking studies are however not trained and teaching them requires a lot of effort. Further, fingertip detection may not be accurate enough and/or cumbersome due to appearance differences in human fingers.

In an improved version, the user has, similar to the fingertip calibration method, to move the head with respect to a device held by the user while keeping the gaze on a single static gaze target (marker) displayed on the device's display. While detection accuracy of an artificial target/marker in the scene camera images might be better than for the fingertip, the user has still to be instructed on beforehand and has no guidance about what to do during the procedure.

Accordingly, there is a need to further improve generating calibration data for eye trackers.

SUMMARY

According to an embodiment of a method for generating data for calibrating a head-wearable device including a first eye camera and a scene camera, the method includes displaying a not translatory movement of an object on a display, using the scene camera to generate field images of a field of view of the user wearing the head-wearable device and instructed to look at the object and to mimic the not translatory movement, and using the first eye camera to generate first images of at least a portion of a first eye of the user while the user is expected to look at the object and mimic the not translatory movement, determining respective positions of the object in the field images, and using the determined positions of the object to determine for the first images respective ground truth values of at least one gaze-direction related parameter of the user.

According to an embodiment of a method for generating data for calibrating a head-wearable device including a first eye camera and optionally a scene camera, the method includes displaying a not translatory movement of an object on a display, instructing a user wearing the head-wearable device to look at the object and mimic the at least one not translatory movement, using the first eye camera to generate first images of at least a portion of a first eye of the user while the user is expected to look at the object and mimic the not translatory movement, generating datasets, each dataset comprising one of the first eye images and optionally a respective field image of a field of view of the user wearing the head-wearable device, the field image being generated using the scene camera while the user is expected to look at the object and mimic the not translatory movement. The not translatory movement of the object is performed so that several values of at least one gaze-related parameter of the user are encoded in the first images. Optionally, a data connection between a computing system configured to host a first database and the head-wearable device or a companion device connected to the head-wearable device may be established, and the datasets may be added to the first database.

According to an embodiment of an eye tracking system, the eye tracking system includes a head-wearable device including a first eye camera and optionally a scene camera, a companion device connectable with a head-wearable device and including a display and a computing and control unit which is configured to control displaying a not translatory movement of an object on the display, and to receive from the first eye camera first images of at least a portion of a first eye of a user wearing the head-wearable device and optionally from the scene camera corresponding field images of a field of view of the user, and at least one of: to instruct the user to look at the object and mimic the not translatory movement of the object, to use the field images to determine for the first images respective ground truth values of at least one gaze-direction related parameter of the user, to generate datasets, each dataset including one of the first eye images and optionally a corresponding ground truth value of the at least one gaze-direction related parameter of the user and/or a respective field image, the images being generated using the cameras of the head-wearable device while the user wearing the head-wearable device is expected to look at the object and mimic the not translatory movement, and to upload the datasets to a computing system configured to host a first database for the datasets via a data connection between the computing system and the head-wearable device or a companion device connected to the head-wearable device.

Other embodiments include corresponding computing or computer systems, computer-readable storage media or devices, and computer programs recorded on one or more computer-readable storage media or computer storage devices, each configured to perform the processes of the methods described herein.

A system of and/or including one or more computers can be configured to perform particular operations or processes by virtue of software, firmware, hardware, or any combination thereof installed on the one or more computers that in operation may cause the system to perform the processes. One or more computer programs can be configured to perform particular operations or processes by virtue of including instructions that, when executed by a one or more processors of the system, cause the system to perform the processes.

Those skilled in the art will recognize additional features and advantages upon reading the following detailed description, and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings:

FIG. 7A illustrates a top view of a head-wearable spectacles device to be calibrated for determining one or more gaze-related parameters;

FIG. 7B shows the front view on the spectacles device according to FIG. 7A;

FIG. 7C is a lateral view on the spectacles device according to FIG. 7A;

FIG. 9A illustrates a user wearing a head-wearable device to be calibrated and holding a companion device including a display displaying a not translatory movement of an object for generating data for calibrating the head-wearable device according to an embodiment.

FIG. 9B to FIG. 9D show respective top views on the display of the companion device according to FIG. 9A according to embodiments;

FIG. 10A illustrates a flow chart of a method for generating data suitable for calibrating a head-wearable device according to embodiments;

FIG. 10B illustrates a flow chart of a method for generating data suitable for calibrating a head-wearable device according to embodiments; and FIG. 10C illustrates an eye tracking system according to an embodiment.

DETAILED DESCRIPTION

Figure 1A:
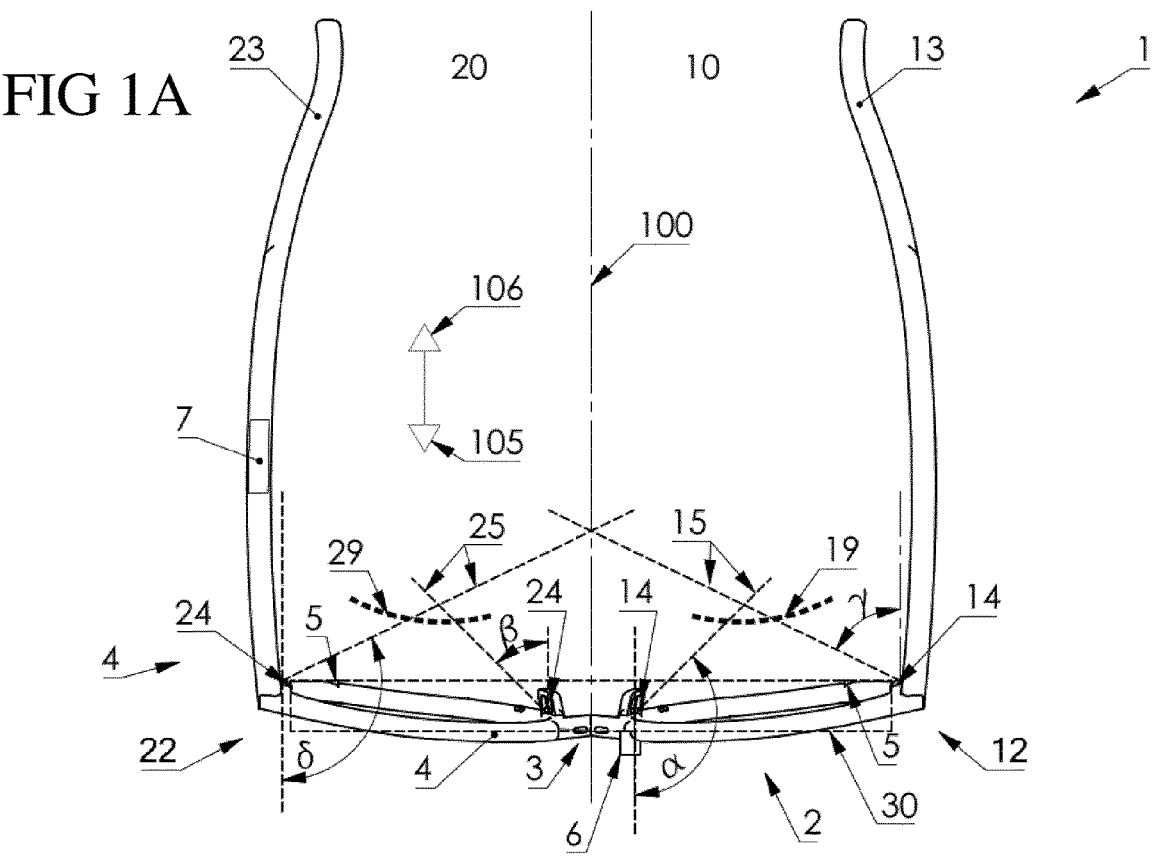
FIG. 1A illustrates a top view of a head-wearable device to be calibrated for determining one or more gaze-related parameters.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is a task of the invention to provide methods, systems and devices allowing for improved generating of data suitable for calibrating a head-wearable device including at least one eye camera for generating images of at least a portion of a respective eye of a user wearing the head-wearable device.

Said tasks are solved by the subject matter of the independent claims.

The head-wearable device is configured for being wearable on a user's head and may be used for determining one or more gaze-related parameters of a user wearing the head-wearable device.

In particular, the head-wearable device may be implemented as (head-wearable) spectacles device comprising a spectacles body, which is configured such that it can be worn on a head of a user, for example in a way usual glasses are worn. Hence, the spectacles device when worn by a user may in particular be supported at least partially by a nose area of the user's face.

This state of usage of the spectacles device being arranged at the user's face will be further defined as the "intended use" of the spectacles device, wherein direction and position references, for example horizontal and vertical, parallel and perpendicular, left and right, front and back, up and down, etc., refer to this intended use. As a consequence, lateral positions as left and right, an upper and lower position, and a front/forward and back/backward are to be understood from user's usual view. Equally, this applies to a horizontal and vertical orientation, wherein the user's head during the intended use is in a normal, hence upright, non-tilted, non-declined and non-nodded position.

According to a further aspect, the spectacles body comprises a left ocular opening and a right ocular opening, which mainly come with the functionality of allowing the user to look through these ocular openings. Said ocular openings can be embodied, but not limited to, as sunscreens, optical lenses or non-optical, transparent glasses or as a non-material, optical pathway allowing rays of light passing through.

According to a further aspect, the spectacles body forms, at least partially or completely, the ocular openings by delimiting these from the surrounding. In this case, the spectacles body functions as a frame for the optical openings. Said frame is not necessarily required to form a complete and closed surrounding of the ocular openings. Furthermore, it is possible that the optical openings themselves have a frame like configuration, for example by providing a supporting structure with the help of transparent glass. In the latter case, the spectacles device has the form similar to frameless glasses, wherein only a nose support/bridge portion and ear-holders are attached to the glass screens, which therefore serve simultaneously as an integrated frame and as optical openings.

In addition, a middle plane of the spectacles body can be identified. In particular, said middle plane describes a structural centre plane of the spectacles body, wherein respective structural components or portions, which are comparable or similar to each other, are placed on each side of the middle plane in a similar manner. When the spectacles device is in intended use and worn correctly, the middle plane coincides with a median plane of the user.

According to a particular aspect, the spectacles body comprises a nose bridge portion, a left lateral portion and a right lateral portion, wherein the middle plane intersects the nose bridge portion, and the respective ocular opening is located between the nose bridge portion and the respective lateral portion.

For orientation purposes, a plane being perpendicular to the middle plane shall be defined, which in particular is oriented vertically, wherein said perpendicular plane is not necessarily firmly located in a defined forward or backward position of the spectacles device.

With the help of both ocular openings a bounding cuboid is defined, which in the following shall serve as an artificial reference system for geometrical design data; thus, said bounding cuboid is a virtual, non-embodied structure having by definition an upper surface, a lower surface, a left lateral surface, and a right lateral surface; hence, one cannot identify the cuboid at the spectacles device in form of a real, cuboid body. The bounding cuboid is oriented with respect to the middle plane of the spectacles body such, that at least the upper surface is perpendicular to the middle plane.

Typically, the bounding cuboid is a rectangular cuboid; hence, the upper and the lower surface are both perpendicular to the middle plane, and the left and right lateral surface are both oriented parallel with regard to the middle plane.

In the following supporting clarifications and explanations about the artificial reference system "bounding cuboid" is provided to the skilled user, in particular in a non-limiting manner: The definition of the bounding cuboid by the ocular openings is performed by virtually covering the volume of both ocular openings with a cuboid, in particular wherein the left lateral surface of the bounding cuboid touches the left ocular opening from the left side, the right lateral surface of the cuboid touches the right ocular opening from the right side, the upper surface of the cuboid touches at least one of the ocular openings from above, and wherein the lower surface of the cuboid touches at least one of the ocular openings from below. As a consequence, the ocular openings do not protrude from the boundary surfaces of the bounding cuboid, and the size of the bounding cuboid does not exceed beyond the maximum extension of the ocular openings.

In one embodiment, the head-wearable device comprises a first eye camera for taking first images of at least a portion of a first eye of the user, i.e. of a left or a right eye of the user. In other words, the first eye camera may be a left eye camera or a right eye camera.

Typically, the head-wearable device further comprises a second eye camera for taking second images of at least a portion of a second eye of the user, i.e. of a right eye or a left eye of the user. In the following the first and second eye cameras are also referred to as left eye camera and right eye camera, and as left camera and right camera, respectively.

In other words, the head-wearable device typically comprises a left and a right eye camera, wherein the left camera serves for taking a left image or a stream of images of at least a portion of the left eye the user, and wherein the right camera takes an image or a stream of images of at least a portion of a right eye of the user.

The recorded eye images do not necessarily need to be a picture as visible by the human eye, but can also be an appropriate representation of the filmed eye in a range of light non-visible for humans.

The eye camera(s) can be arranged at the spectacles body in inner eye camera placement zones and/or in outer eye camera placement zones, in particular wherein said zones are determined such, that an appropriate picture of at least a portion of the respective eye can be taken for the purpose of determining one or more a gaze-related parameter; in particular, the cameras are arranged in a nose bridge portion and/or in a lateral edge portion of the spectacles frame such, that an optical field of a respective eye is not obstructed by the respective camera. The optical field is defined as being obstructed, if the camera forms an explicitly visible area/portion within the optical field, for example if the camera points out from the boundaries of the visible field into said field, or by protruding from the boundaries into the field. For example, the cameras can be integrated into a frame of the spectacles body and thereby being non-obstructive. In the context of the present invention, a limitation of the visible field caused by the spectacles device itself, in particular by the spectacles body or frame is not considered as an obstruction of the optical field.

According to an aspect of the spectacles device, the cameras are arranged in the inner eye camera placement zones only, in particular wherein not more than one single camera is provided in each inner eye camera placement zone; hence, there is typically only one left eye camera firmly associated to the left ocular opening, and only one right eye camera firmly associated to the right ocular opening.

The inner eye camera placement zones may be allocated in a nose bridge portion of the spectacles body. In detail, it has been found out by extensive experiments and user tests that the respective inner eye camera placement zone shall extend between 2 mm to 14 mm, in particular between 3 mm to 12 mm, in a horizontal direction perpendicular to the middle plane in order to obtain optimal images for determining the one or more gaze-related parameter. In particular, the inner eye camera placement zones can be located and do extend in the perpendicular plane, wherein—starting from the middle plane in the left and right horizontal direction—the respective inner eye camera placement zone begins in a horizontal direction at a distance of 2 mm, in particular 3 mm, from the middle plane, and reaches in horizontal direction towards a distance of 14 mm, in particular 12 mm, from the middle plane.

According to an alternative or to an addition, at least one camera or both cameras can be arranged in (an) outer eye camera placement zone(s). In particular, the spectacles device comprises not more than two cameras, wherein the right camera is arranged in the right outer eye camera placement zone, and wherein the left camera is arranged in the left outer eye camera placement zone.

According to an aspect, the left camera is placed in the left outer eye camera placement zone, and the right camera is placed in the right outer eye camera placement zone, or the left camera is placed in the left inner eye camera placement zone, and the right camera is placed in the right inner eye camera placement zone. This symmetric camera placement strategy results in an improved capability of determining a gaze-related parameter of the user, in particular if the light conditions of an environment of the spectacles device are not optimal. Furthermore, the symmetric application of cameras may also come with benefits with respect to the application of neuronal networks, in particular convolutional neuronal networks, for determining a gaze-related parameter. According to another embodiment, more than one left and/or more than one right camera may be used.

The left outer eye camera placement zone—when projected in the perpendicular plane—is located in a left lateral portion of the spectacles body, and extends 6 mm, in particular 5 mm, more particular 4 mm, towards the middle plane from the left lateral surface of the bounding cuboid, and extends 7 mm, in particular 6 mm, more particular 5 mm, away from the middle plane measured from the left lateral surface in a direction away from the middle plane.

Also, the right outer eye camera placement zone—when projected in the perpendicular plane—is located in a right lateral portion of the spectacles body, and extends 6 mm, in particular 5 mm, more particular 4 mm, towards the middle plane from the right lateral surface of the bounding cuboid, and extends 7 mm, in particular 6 mm, more particular 5 mm, away from the middle plane measured from the right lateral surface in a direction away from the middle plane.

According to a further aspect, the inner eye camera placement zone extends, when projected in the perpendicular plane, in vertical direction between 9 to 31 mm, in particular 12 to 28 mm, from the upper surface towards the lower surface of the bounding cuboid.

Additionally or alternatively, the outer eye camera placement zone—projected in the perpendicular plane—has a size of 25 to 33 mm, particular of 28 to 30 mm, in a perpendicular direction with respect to the upper surface, and, when the spectacles device is in intended use, in vertical direction.

Definitions, directions and basic information of the head-wearable device as described above shall apply also in the following.

According to a first design, the left eye camera is arranged in the nose bridge portion, wherein an optical axis of the left camera is inclined with respect to the middle plane by an angle of 150° to 142° (or −30° to −38°), in particular of 144° (or −36°). Generally, angles of the inclination are provided and shall be measured positive in counter-clockwise direction.

According to a second design, the right eye camera is arranged in the nose bridge portion, wherein an optical axis of the right camera is inclined with respect to the middle plane by an angle of 30° to 38°, in particular of 36°.

Both designs come with the benefit, that an optimal view of the eye cameras onto an eyeball of the user is enabled, wherein an obstruction of the visible field of the user is essentially not noticeable by the user and therefore is not present; firstly, the human mind mostly ignores any obstruction in the nose area of the face, because the nose itself forms a permanent obstruction of the optical field; secondly, the nose bridge portion usually serves as a support for the spectacles device on the nose of a user, wherein a micro-camera can be integrated in support elements of the nose portion.

According to a third design, the left eye camera is arranged in the left lateral portion, wherein an optical axis of the left eye camera is inclined with respect to the middle plane by an angle of 55° to 70°, in particular 62°.

According to a fourth design, the right eye camera is arranged in the right lateral portion, wherein an optical axis of the right camera is inclined with respect to the middle plane by an angle of 125° to 110° (or −55° to −70°), in particular 118° (or −62°).

According to a preferred embodiment, the head-wearable device comprises not more than two eye cameras, wherein one eye camera—the left camera—is arranged according to the first design, and wherein the other camera—the right camera—is arranged according to the second design.

In the context of a second preferred embodiment, the spectacles device comprises not more than two eye cameras, wherein one eye camera—the left camera—is arranged according to the third design, and wherein the other eye camera—the right camera—is arranged according to the fourth design.

However, the combination of the first and the third design or of the second and the fourth design is also possible.

Furthermore, but not limited to it, a combination of at least three of the designs, or even of all designs shall be disclosed in the context of the invention, wherein the limitation on not more than two cameras is therefore omitted in this very case.

All mentioned designs, in particular combinations thereof, provide a spectacles device for obtaining suitable image data for determining one or more gaze-related parameters of the user, in particular when applying a convolutional neuronal network for this determination.

In the following, preferred aspects are described, wherein said aspects particularly refer to all previously discussed aspects and embodiments of the head-wearable device.

Furthermore, according to a particular aspect, a frame of the spectacles body is essentially symmetrical to the middle plane, wherein only minor areas, portions or elements of the frame are non-symmetrical.

According to specific aspect, the eye camera(s) is (are) arranged within the lower 75%, in particular within the lower 50%, preferred within the lower 25%, of the volume of the bounding cuboid.

Furthermore, the head-wearable device may have illumination means for illuminating the left and/or right eye of the user, in particular if the light conditions within an environment of the spectacles device are not optimal.

Typically, the head-wearable device comprises a scene camera for taking images of a field of view of the user wearing the head-wearable device. The scene camera hence must not be understood as a camera for taking a picture of an eye of the user. By this beneficial calibration processes for determining of the gaze-related parameter can be made possible.

According to an embodiment, a method for generating data for calibrating a head-wearable device having a first eye camera and a scene camera, the method includes displaying a not translatory movement of an object on a display. While an appropriately instructed user wearing the head-wearable device is expected to look at the object and mimic the not translatory movement, the scene camera takes field images of a field of view (FOV) of the user and the first eye camera takes first images of at least a portion of a first eye of the user. Respective positions of the object in the field images are determined and the determined positions of the object are used to determine for at least some of the first images corresponding respective ground truth values of at least one gaze-direction related parameter of the user.

Accordingly, highly accurate calibration data can be obtained anywhere in a fast, simple, and intuitive manner. The only instruction the user has to get in advance or even during the displayed not translatory movement is to mimic the movement of the object with their own head, while looking at it on the display.

The obtained calibration data can be used for accurate user-specific calibration of the head-wearable device.

Alternatively or in addition, the first (and second) eye images, the corresponding positions of the object in the field images, the corresponding ground truth values of the at least one gaze-direction related parameter determined using the positions of the object in the field images, and/or the corresponding field images may be stored as respective datasets in a database that may be used for training neural networks.

Note that for reliably and efficiently analyzing the eye image(s) with respect to gaze-related parameters, training of a used neuronal network architecture, in particular a convolutional neural network architecture, with a large number of teaching examples is desirable. For this purpose, a respective database for storing the teaching examples obtained with the help of the spectacles device and/or other head-wearable device as described herein has been found to be advantageous.

Note further that even datasets only including eye image(s) (so called unlabeled data) may be beneficial for training the neural networks.

In other words, the method may also be used for generating data (datasets) for training neural networks.

To generate the calibration data and/or training data neither an additional operator nor experienced users are required. This is because the user will automatically focus their gaze on the displayed object throughout the procedure as they have to pay attention to its movement in order to mimic it. One can thus simply use the position of the displayed object in the scene camera images to determine ground truth gaze-direction related parameters of the user, in particular gaze directions and/or gaze angles of the user.

The choreography performed by the displayed object may intuitively define the required movements and the speed of those movements for the user without requiring lengthy instructions.

Using a choreography with diverse enough object movements/object orientations animating the user to mimic the object movements with the head while gazing at the displayed object ensures that diverse gaze (angle) samples can be collected without a supervisor.

Typically, the not translatory movement of the object on the display represents a rotational movement, more typically a sequences of rotational movements.

In particular, a projection of rotational movement(s) of the object may be displayed on the display.

The displayed not translatory movement of the object typically covers a representative range of the gaze-related parameter(s), more typically a comparatively large range, and even more typically at least substantially an entire (for humans) physiologically possible range of values of the gaze-related parameter(s).

For example, the displayed not translatory movement of the object may cover or represent at least 95% or even at least 98% of a physiologically possible range of values of a gaze-direction related parameter.

For example, an angle of the rotational movement(s) of the object about a (central) vertical axis may vary in a range from at least about −20° to about +20°, typically in a range from at least about −45° to about +45°.

Likewise an angle of the rotational movement of the object about a (central) horizontal axis may vary in a range from at least about −10° to about +10°, typically in a range from at least about −25° to about +25°, more typically in a range from at least about −50° (depression) to at least about +30° (elevation).

The displayed (choreography of) object movements typically includes rotational movements of the object about two or even three different axes, for example about the vertical axis and a horizontal axis which are both orthogonal to a projection axis.

However, the (choreography of) object movements may also include rotational movements about the (horizontal) projection axis.

The not translatory movement of the object typically includes at least one fixed point. One fixed point may be the pivot point of the object, typically defined by the axes of rotation which are typically at least substantially centred with respect to the object. The pivot point of the object may or may not be displayed on the display.

The parameter(s) of the not translatory movement such as angle(s) of rotation of rotational movement(s) is/are typically a smooth (differentiable) function of time.

However, the not translatory movement may also be performed step-wise in time. In particular, the not translatory movement may be paused when the user's head movements are determined to lie outside expected ranges in a feed-back mode.

In order to particularly intuitively animate the user to mimic (imitate, follow in a mirrored way) the motions of the object with the user's head properly, the object typically has two eyes. More typically the object represents a face or even a head, in particular a humanoid face or a humanoid head. For example, the object may be a stylized human(oid) face or stylized human(oid) head or a respective ideogram such as a smiley or an avatar.

The authors have found out that the users imitate the movements of the object very easily (intuitively) and reliably, if the eyes of the object appear to be directed or even keep being directed at the user during displaying the not translatory movement.

For this reason, the object's eyes typically keep looking in one direction, in particular straight ahead (out of the display) as the object performs the not translatory movement.

For example, the displayed head may perform pitching movements, tilting movements, and/or circular, elliptical, and/or oscillating rotary and/or spiralling movements while the head's eyes are substantially fixedly looking into a direction perpendicular to the surface of the display. Accordingly, the head's eyes are looking in the direction of the user holding the display.

In one embodiment, a method for generating data related to at least one gaze-related parameter of a user wearing a head-wearable device including a first eye camera and a scene camera includes displaying a not translatory movement of an object on a display, the object representing a head having two eyes, in particular a human(oid) head, wherein an orientation of the head is changed during the not translatory movement, wherein the two eyes of the head are gazing in a given direction during the not translatory movement, instructing the user wearing the head-wearable device to look at the object, in particular the eyes of the head and mimic the not translatory movement, generating first images of at least a portion of a first eye of the user with the first eye camera and field images of a field of view of the user with the scene camera while the user is expected to look at the object and mimic the not translatory movement, and processing the first images and the field images.

Processing the first images and the field images may include analyzing the first images and the field images and/or generating datasets, each dataset including one of the first (eye) images and optionally a respective field image or a respective ground truth value of a gaze-direction related parameter determined for the first eye image based on the field image(s).

Again, a second eye camera of the head-wearable device typically takes second images of at least a portion of a second eye of the user synchronously with the first eye camera, and the second images may be further processed in parallel with the first images and/or stored as pairs in the datasets.

Analyzing the eye images and the field images may include at least one of using the eye images and the field images to determine a sequence of at least one gaze-direction related parameter of the user, trying to identify the user based on the sequence of the at least one gaze-direction related parameter, and allowing the user (physical and/or logical) access to a device or a room associated with the display when the user is identified.

For example, the display of the companion device may show a locking screen which displays the not translatory movement and may be unlocked when the user is identified based on comparing the sequence of the at least one gaze-direction related parameter with one or more previously obtained sequences or one or more characteristics (identification code) derived therefrom.

The eye images and the field images may also be used for calibrating the head-wearable device, in particular for user-specific calibration of the head-wearable device with respect to gaze-related parameter(s) of the user, in particular gaze-direction related parameter(s) of the user to be determined using images of the eye camera(s) taken after calibrating, typically in real time or at least near real time.

The gaze-direction related parameter may be a gaze direction, a cyclopean gaze direction, a 3D gaze point, a 2D gaze point, a visual axis orientation, an optical axis orientation, a pupil axis orientation, and a line of sight orientation of the user.

The gaze-related parameter may be a gaze-direction related parameter or a position and/or an eyelid closure, a pupil area, a pupil size, a pupil diameter, a sclera characteristic, an iris diameter, a characteristic of a blood vessel, a cornea characteristic of at least one eye, a cornea radius, an eyeball radius, a distance pupil-center to cornea-center, a distance cornea-center to eyeball-center, a distance pupil-center to limbus center, a cornea keratometric index of refraction, a cornea index of refraction, a vitreous humor index of refraction, a distance crystalline lens to eyeball-center, to cornea center and/or to corneal apex, a crystalline lens index of refraction, a degree of astigmatism, an orientation angle of a flat and/or a steep axis, a limbus major and/or minor axes orientation, an eye cyclo-torsion, an eye intra-ocular distance, an eye vergence, a statistics over eye adduction and/or eye abduction, and a statistics over eye elevation and/or eye depression, data about blink events, drowsiness and/or awareness of the user, parameters for user iris verification and/or identification.

Points and directions may be specified within the scene camera images, an eye camera coordinate system, a scene camera coordinate system, a device coordinate system, a head coordinate system, a world coordinate system or any other suitable coordinate system.

In one embodiment, a method for generating data suitable for calibrating a head-wearable device as described herein includes displaying a not translatory movement of an object on a display, instructing a user wearing the head-wearable device to look at the object and mimic the not translatory movement, using a first eye camera and/or a second eye camera to generate eye images of at least a portion of a respective eye of the user while the user is expected to look at the object and mimic the not translatory movement, generating datasets, each dataset comprising one of the eye images or even a pair of corresponding eye images and optionally a respective field image of a field of view of the user wearing the head-wearable device, the field images being generated using the scene camera while the user is expected to look at the object and mimic the not translatory movement. The not translatory movement of the object is performed so that several values of at least one gaze-related parameter of the user can be encoded in the eye images.

To avoid that the user is getting bored and learns the choreography "by heart" thus not mimicking the movements accurately, in particular when the data suitable for calibrating are generated several times, for example to compensate short, middle or long-term changes, the not translatory movement of the object is typically at least partly randomized. For example, the sequence of rotational movements may be randomized prior to taking the images.

Imitating of the object's movements by the user and/or generating data suitable for calibrating may be further facilitated if the display is held by the user wearing the head-wearable device, preferably at arm's length.

Accordingly, the display is typically a display of a portable companion device, in particular a mobile computing device, more particular a smartphone or a tablet.

The head-wearable device and the companion device are typically connected with each other via a wired connection, in particular a USB-connection.

Via the wired connection the head-wearable device may be supplied with electric power.

Furthermore, data (control data, images and/or image related data) may be exchanged between the head-wearable device and the companion device. This may facilitate generating data suitable for calibration.

For example, a control and/or processing unit (in the following also referred to as processing unit) of the companion device may not only be used for controlling displaying the not translatory movement of the object but also for determining the positions of the object in the field images transferred to the companion device, and/or for determining the ground truth values of the gaze-direction related parameter(s).

The ground truth values of the gaze-direction related parameter(s) may also be determined by a control and/or processing unit of the head-wearable device or by at least one processing unit of a remote computing system, such as a server or a cloud system.

Furthermore, the workload for determining the ground truth values of the gaze-direction related parameter(s) (and further computational tasks) may also be shared between the processing unit of the companion device, the control and/or processing unit of the head-wearable device and the at least one processing unit of the remote computing system.

However, the processing unit of modern smartphones and tablets may include several cores, and is typically powerful enough to determine the ground truth values of the gaze-direction related parameter(s) in real time or at least in near real time.

The positions of the displayed object in the field images may be determined using an object recognition technique or a localization technique.

Knowing the positions of the displayed object in the field images allows calculating respective ground truth values of the gaze-direction related parameter(s) of the user for the corresponding eye images.

For example, the coordinates of the presumed gaze point of the user, which may be assumed to be the eyes of the displayed object (or a point in between the eyes) in the field images, may be determined using an object recognition technique or a localization technique. Knowing the geometry, ground truth values of the gaze point and/or the gaze direction in a co-ordinate system defined by the head-wearable device may be determined.

Thereafter, a validity check for the calculated ground truth values may be performed.

For example, outliers may be detected during the validity check.

For detecting outliers, the calculated ground truth values may be compared with predicted values of the gaze-direction related parameter(s), i.e. values of the gaze-direction related parameter(s) determined using the eye images.

A trained neural network, in particular a trained convolutional neural network may be used for determining the predicted values. For this purpose, corresponding pairs of first and second images may be used as inputs of the trained neural network, typically as respective concatenated images.

Performing the validity check may also include determining a first correlation measure between the predicted values of the gaze-direction related parameter(s) and the determined positions of the object in the field images or the calculated ground truth values.

Alternatively or in addition, a second correlation measure between rotational angles of the object and corresponding determined positions of the object in the field images or corresponding calculated ground truth values may be determined during validity checking.

Alternatively or in addition, a third correlation measure between rotational angles of the displayed object and corresponding predicted values of the gaze-direction related parameter(s) may be determined during validity checking.

Alternatively or in addition, a fourth correlation measure between rotational angles of the displayed object and data of an inertial measurement unit (IMU) of the head-wearable device (reflecting the user's head movements) may be determined during validity checking.

Calculated ground truth values not fulfilling the validity check may be discarded.

The calculated ground truth values may be discarded if at least one of the determined correlation measures is below a respective given threshold and/or if an outlier has been detected.

The processes of displaying the not translatory movement and calculating ground truth values may be prolonged or even restarted when the number of discarded calculated ground truth values is higher than a respective predefined number.

The correlation measures and/or the data of the inertial measurement unit may also be used for monitoring movements of the head of the user and/or for determining a feed-back signal for controlling the not translatory movement of the displayed object.

Although the movements of the head of the user may in principle be monitored by another scene camera (not attached to the head-wearable device), e.g. a camera of the companion device, using the scene camera of the head-wearable device is preferred for several reasons. Detecting the display of the companion device in field images taken by the scene camera of the head-wearable device is much easier than detecting the user's head in external scene images and requires less device communication overhead. Furthermore, the field images are typically taken anyways by the scene camera of the head-wearable device.

Monitoring the movements of the head of the user may include determining whether the movements of the user's head are out of an expected range.

In such a case, the user may be notified acoustically, e.g. via a speaker of the companion device, and/or visually, in particular on the display or via a visible light LED of the head-wearable device. For example, a size, a rotational speed, a rotational angle of the movement, a colour and/or a facial expression of the displayed object may be changed when the movements of the user's head has been determined to be out of the expected range.

In particular, the not translatory movement of the displayed object may be sped up and slowed down or even paused, respectively, when the head of the user is moving slower than expected and faster than expected, respectively.

Alternatively or in addition, a rotational angle of the not translatory movement may be increased when the head of the user is moving too little while mimicking the not translatory movement.

Likewise, the rotational angle of the not translatory movement may be decreased when the head of the user is moving too much or too far while mimicking the not translatory movement.

In particular when the field images are taken with a higher frame rate than the eye images, the calculated ground truth values may be determined as fitted and/or interpolated calculated ground truth values.

The (non-discarded) calculated ground truth values or the fitted and/or interpolated calculated ground truth values may be allocated to a respective first image or a respective pair of first and second images, and/or stored in a respective dataset.

The datasets or the eye images and the corresponding ground truth values may be used for calibrating the head-wearable device.

Calibrating the head-wearable device typically includes using the ground truth values and the predicted values of the gaze-direction related parameter(s) to determine a respective correction function for the user.

The correction function(s) for the user may be stored and later used to user-specifically correct values of the gaze-direction related parameter(s) determined from (later taken) eye images.

The correction function(s) for the user may be stored, locally, for example in a memory of the head-wearable device, the mobile companion device and/or within the database.

The correction function(s) may be implemented as polynomic function(s). For example, a polynomial of two input variables may be used as a correction function for a 2D-gaze direction and a 2D-gaze point, respectively.

The correction function(s) for the user may also be used to calculate corrected predicted values of the gaze-direction related parameter determined for the eye images taken during displaying the not translatory movement.

Thereafter, a residual error between the corrected predicted values and the calculated ground truth values may be determined.

If the determined residual error is above a given threshold, some calculated ground truth values significantly contributing to the residual error may be discarded. More typically, all calculated ground truth values are discarded and the calibration may be repeated if the residual error is above the given threshold.

According to an embodiment, an eye tracking system includes a head-wearable device, a scene camera and a first eye camera, typically a first and a second eye camera, a companion device connectable with the head-wearable device and having a display, and a computing and control unit which is configured to control displaying a not translatory movement of an object on the display, receive from the first eye camera first images of at least a portion of a first eye of a user wearing the head-wearable device and from the scene camera corresponding field images of the field of view of the user wearing the head-wearable device, and typically from the second eye camera second images of at least a portion of a second eye of the user wearing the head-wearable device. The computing and control unit is further configured to instruct the user to look at the object and mimic the displayed not translatory movement, to use the field images to determine for the eye images respective ground truth values of at least one gaze-related parameter of the user, in particular at least one gaze-direction related parameter of the user, to generate datasets, each dataset comprising one of the first eye images, typically a corresponding second eye image, and optionally a corresponding ground truth value of the at least one gaze-direction related parameter of the user and/or a respective field image, and/or to upload the datasets to a computing system configured to host a first database for the datasets via a data connection between the computing system and the head-wearable device or the companion device connected to the head-wearable device.

The head-wearable device may be a spectacles device, in particular a spectacles device as described herein, a goggles, an AR head-wearable display, and a VR head-wearable display.

The companion device is typically a mobile computing device, in particular a smartphone or a tablet.

The computing and control unit may be provided by a control and/or processing unit of the head-wearable device and/or by a control and/or processing unit of the companion device.

This means that the computing and control unit may be distributed/provided by interacting/communicating respective components of both the companion device and the head-wearable device.

In one embodiment, at least the main functions of the computing and control unit are provided by the control and/or processing unit of the companion device.

Furthermore, the computing and control unit may have hardware components which are particularly designed for the desired tasks, in particular a respective system-on-chip (SoC), e.g. for running a neural network instance.

The computing and control unit is typically configured to perform any or even all the steps of the method explained herein.

For example, the computing and control unit may be configured to use the eye images to determine respective predicted values for the gaze-related parameter(s), in particular the gaze-direction related parameter(s), to use the ground truth values and the predicted values of the gaze-related parameter(s), in particular the gaze-direction related parameter(s) to determine a respective correction function for the user, to store the correction function(s) for the user, and/or to use the correction function(s) to correct predicted values of the gaze-direction related parameter.

According to an embodiment, a method for creating and updating a database for training a neural network, in particular a convolutional neural network, is provided. The method includes presenting a first stimulus comprising a not translatory movement of an object on a display of a companion device to a first user wearing a head-wearable device. The head-wearable device includes a first camera and a second camera. The first camera is arranged next to a left eye of the first user and the second camera is arranged next to a right eye of the first user when the first user is wearing the head-wearable device. When the first user is expected to respond to the first stimulus or expected to have responded to the first stimulus, the first camera of the head-wearable device is used to generate left images of at least a portion of the left eye of the first user, and a second camera of the head-wearable device is used to generate a right image of at least a portion of the right eye of the first user. A data connection is established between the head-wearable device and the database, typically via the companion device, which is connected with the head-wearable device, to a computing system configured to host the database. Datasets each including one of the first left images, a corresponding one of the first right image and a corresponding first representation of a gaze-related parameter are generated. The first representations are correlated with the first stimulus. The first datasets are added to the database. In particular, the first representations may be respective ground truth values of at least one gaze-direction related parameter of the user which are determined from field images recorded in parallel using a scene camera of the head-wearable device.

The method allows maintaining and improving the database with the help of the users. As the database can be used for improving the performance of an instance of the neural network used at the user site (e.g. running on the head-wearable device), the users are interested in allowing data exchange between the typically user owned head-wearable device and a computing system for hosting the database and training or retraining the neural network using the database.

In the following the database is also referred to as first database and image database.

Within this specification the terms "first camera", "first eye camera" and "left camera" are used synonymously. Likewise, the terms "second camera", "second eye camera" and "right camera" are used synonymously herein.

The term "neural network" (NN) as used in this specification intends to describe an artificial neural network (ANN) or connectionist system including a plurality of connected units or nodes called artificial neurons. The output signal of an artificial neuron is calculated by a (non-linear) activation function of the sum of its inputs signal(s). The connections between the artificial neurons typically have respective weights (gain factors for the transferred output signal(s)) that are adjusted during one or more learning phases. Other parameters of the NN that may or may not be modified during learning may include parameters of the activation function of the artificial neurons such as a threshold. Often, the artificial neurons are organized in layers which are also called modules. The most basic NN architecture, which is known as a "Multi-Layer Perceptron", is a sequence of so called fully connected layers. A layer consists of multiple distinct units (neurons) each computing a linear combination of the input followed by a nonlinear activation function. Different layers (of neurons) may perform different kinds of transformations on their respective inputs. Neural networks may be implemented in software, firmware, hardware, or any combination thereof. In the learning phase(s), a machine learning method, in particular a supervised, unsupervised or semi-supervised (deep) learning method may be used. For example, a deep learning technique, in particular a gradient descent technique such as backpropagation may be used for training of (feedforward) NNs having a layered architecture. Modern computer hardware, e.g. GPUs makes backpropagation efficient for many-layered neural networks. A convolutional neural network (CNN) is a feed-forward artificial neural network that includes an input (neural network) layer, an output (neural network) layer, and one or more hidden (neural network) layers arranged between the input layer and the output layer. The specialty of CNNs is the usage of convolutional layers performing the mathematical operation of a convolution of the input with a kernel. The hidden layers of a CNN may include convolutional layers as well as optional pooling layers (for downsampling the output of a previous layer before inputting it to the next layer), fully connected layers and normalization layers. At least one of the hidden layers of a CNN is a convolutional neural network layer, in the following also referred to as convolutional layer. Typical convolution kernel sizes are for example 3×3, 5×5 or 7×7. The usage of convolutional layer(s) can help to compute recurring features in the input more efficiently than fully connected layers. Accordingly, memory footprint may be reduced and performance improved. Due to the shared-weights architecture and translation invariance characteristics, CNNs are also known as shift invariant or space invariant artificial neural networks (SIANNs). In the following, the term "model of a neural network" intends to describe a set of data required to define a neural network operable in software and/or hardware. The model typically includes data referring to the architecture of the NN, in particular the network structure including the arrangement of neural network layers, the sequence of information processing in the NN, as well as data representing or consisting of parameters of the NN, in particular the connection weights within fully connected layers and kernel weights within convolutional layers.

Traditional eye tracking algorithms extract hand crafted features from the eye images, like for example the pupil contour. The observed features are then used to either fit an eye model to the observations, or to directly regress the output.

In contrast, the systems described herein perform end-to-end learning-based gaze estimation, where the input image is directly given to a learning algorithm without prior extraction of handcrafted features.

In a training phase, the network learns to interpret the input image(s) automatically in order to output the correct result. Supervised learning algorithms, such as those employing neural networks (NN) rely on the existence of so-called labelled data, i.e. some kind of input data in combination with ground truth connected to that input data. For example, an image recorded by a camera can represent the input data. The ground truth value or values can be any low or high level piece of information which is encoded in any form in the input data and which is known at the time the input data has been generated.

Figure 1B:
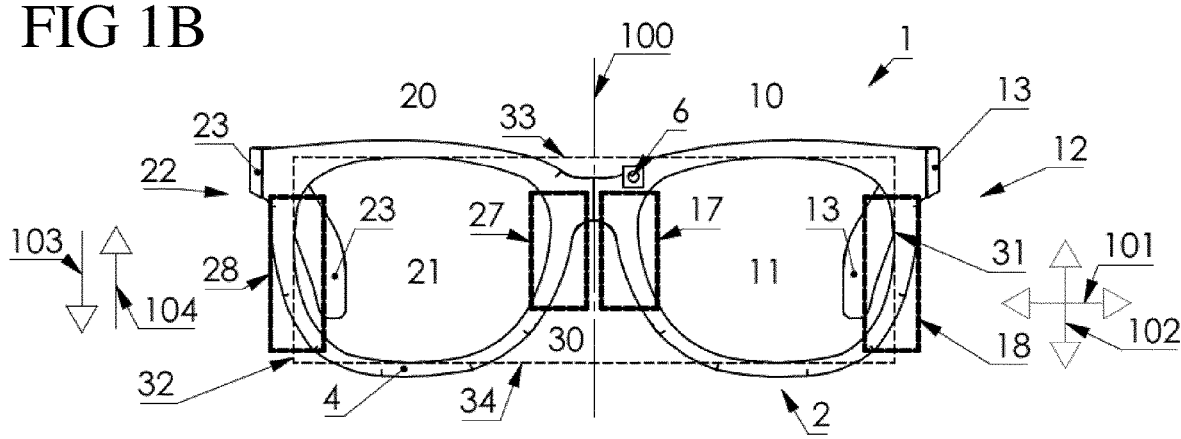
FIG. 1B shows the front view on the spectacles device according to FIG. 1A.
Figure 1C:
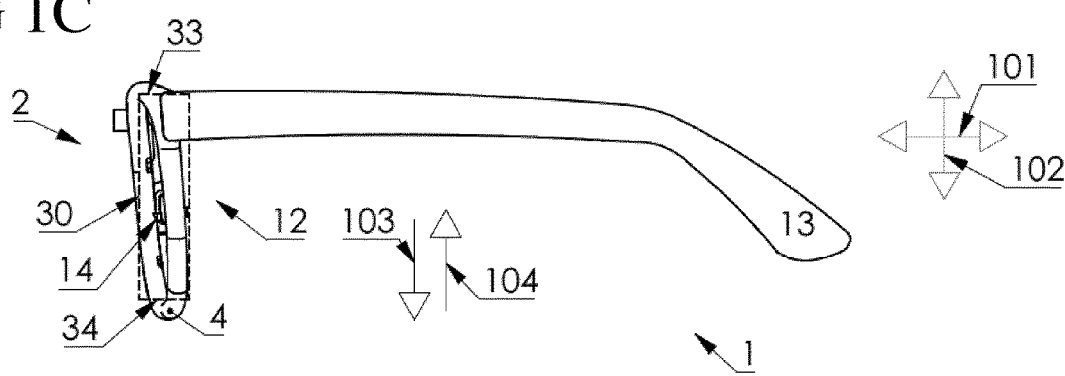
FIG. 1C is a lateral view on the spectacles device according to FIG. 1A.

Traditionally, a user wearing a head-wearable device as shown in FIG. 1A to FIG. 1C can be asked to look at a particular marker point or object in space, the coordinates of which within the video images recorded by a scene camera connected to the device can be precisely determined. The image or images recorded by one or more optical sensors (cameras) facing the eye(s) of the person then represent the input data which encodes the information about the person's gaze direction, while said coordinates represent the ground truth. Having the person look at markers in many different directions and distances thus produces ground truth for all possible gaze directions. Advantageously, the method of generating data including displaying a not translatory movement of an object as described can be used instead. Thereby, efficiently collecting large amounts of labelled data, also called training data, which can thus form the basis for training a learning algorithm is enabled.

A NN typically implements a mathematical model with a large number of parameters, which is set up to receive an entity of input data (for example the pixel values of an image stretched into a 1-dimensional vector) and calculates a prediction output in a format corresponding to the ground truth (for example a pair of (x/y) coordinates). The parameters (weights) of the network are usually randomly initialized. The goal of the training procedure is then to optimize the parameters such that when a training example is input, its ground truth value is correctly output. Furthermore, when training is finished, a new entity of labeled input data, also called test data, which has not been used for training, is supposed to produce a correct prediction when fed into the network. The training procedure is done by feeding training examples into the network and for example summing the absolute deviations of the output predictions from the ground truths, which yields a cost value or function. Numerical methods are used to minimize this cost in an iterative fashion which updates the parameters of the network model (backpropagation, gradient descent). A learning rate parameter is part of such methods in order to update the parameters. During the neural network training one typically incrementally decreases the learning rate (learning rate decay), i.e. the step size of the gradient descent algorithm. Decreasing the learning rate following a cosine curve has turned out to be beneficial in significantly reducing training time without impacting accuracy negatively.

The training process can for example be stopped once a desired prediction accuracy based on a set of test data examples is achieved or once the cost does not substantially decrease further. The final values of the parameters can then be digitally stored as a "model" and applied to a new input data example to generate a prediction. Depending on the amount of training data and the complexity of the model, training can be a process requiring several hours or days of calculation time, even when parallelized on many GPUs, while applying the model in a forward pass on a single item of input data is supposed to be quasi instantaneous.

For a regression problem, i.e. a problem with continuous output space like for example predicting a pair of (x/y) coordinates, one typically designs neural networks as follows:

Input→some neural network layers→Intermediate Feature Representation→Linear Combination→Output in $\mathbb{R}^{2\,2}$ (respectively some small subset of $\mathbb{R}^{2\,2}$).

A different approach that has shown to increase accuracy works as follows: discretize the output space, i.e. a small subset of $\mathbb{R}^2$, to k different values. Instead of directly regressing the output (for example predicting a pair of (x/y) coordinates), one computes a probability distribution over the possible output values k. As a final output one computes the weighted mean of all values, weighted by their respective probability. The information flow thus becomes:

Input→some neural network layers→Intermediate Feature Representation→Linear Combination→Output in $\{1, \ldots, k\}$→Softmax→Probability distribution P over $\{1, \ldots, k\}$→weighted mean of $\{1, \ldots, k\}$ with P→Output within the small subset of $\mathbb{R}^2$.

Enforcing the representation as a probability distribution as an intermediate result seems to have a regularizing effect and as such reduces the prediction error of the network.

Establishing the data connection typically includes connecting the head-wearable device with a computing system operating as a server hosting the database. The head-wearable device may be directly connected with the computing system (server), for example via WLAN and/or an internet connection, or indirectly, for example via a desktop computer, or a companion device such as a tablet, a laptop, or a smartphone (mobile phone) connectable with the head-wearable device and the computing system.

Typically, a plurality of datasets referring to the first user and including a respective left image, a respective right image and a respective representation of the gaze-related parameter is generated and added to (stored in) the database.

Accordingly, the database includes datasets of the user allowing a sufficiently good feature generalisation of the neural network during one or more training phases as well as a high accuracy of predicting gaze-related parameters using the trained neural network.

For example, at least 10 datasets, more typically at least 50 datasets and even more typically at least hundred datasets of the first user may be stored in the database.

Furthermore, the images of the datasets of the first user may be generated under different conditions, for example for a fresh and a tired user or at different times and/or for different lighting conditions. Even further, the images of the datasets of the first user may be generated for different distances between a presented stimulus and the user (resulting in different levels of vergence of the eyes).

Therefore, several stimuli may be presented to the first user and respective datasets may be generated and added to the database.

For statistical reasons some of the stimuli may be equal.

Typically, respective datasets referring to several users are generated and added to (stored in) the database.

Accordingly, the feature generalisation of the neural network in the training phase as well as the accuracy of predicting gaze-related parameters using the trained neural network may be further improved as more and more datasets from an increasing number of users and recorded under varying conditions are added.

Typically, datasets referring to at least 10 users, more typically to at least 100 users and even more typically to at least several hundred, several thousand or even several 10,000 users or more may be stored in the database.

The dataset(s) may be generated at the user side, for example using a processing unit of the respective head-wearable device and/or of a connected desktop computer, tablet, laptop, or smartphone.

Further, the dataset(s) may be locally stored until a connection with the computing system (server) is available.

Furthermore, the first camera of the head-wearable device or the further head-wearable device may be used to generate a further left image of at least a portion of the left eye of the first or the second user and the second camera of the respective head-wearable device may be used to generate a further right image of at least a portion of the right eye of the respective user, when the respective user is expected to respond to the further stimulus or expected to have responded to the further stimulus. A further dataset including the further left image and the further right image may be generated and added to the database.

The authors have found out, that a certain fraction of weakly labelled datasets, i.e. datasets with less accurate known gaze-related parameters, or even non-labelled datasets, i.e. datasets for which no valid representations, e.g. values of the gaze-related parameter(s) are known, can still improve the performance of the NN trained using the database. This is because even unlabeled datasets include information about the contained image diversity.

For example, the database may include up to 70%, more typically up to 80%, and even more typically up to 90% or more of weakly and/or non-labelled datasets.

In one embodiment, more than one gaze-related parameter, for example two or three gaze-related parameters are added with at least one of the datasets to the database.

According to an embodiment, a respective given or resulting value of the gaze-related parameter(s) is determined for the respective user expected to respond or have responded to the respective stimulus.

The determined given or resulting value of the gaze-related parameter(s) may be used as respective representation of the gaze-related parameter(s) of the dataset(s).

The determined given or resulting value may be considered as the actual or ground truth value of the gaze-related parameter.

In the following, a dataset which includes a left image of at least a portion of the left eye, a right image of at least a portion of the right eye and a corresponding actual or ground truth value of one or more a gaze-related parameters such as the gaze point or gaze direction is also referred to as labelled dataset. Typically, the two images of a dataset are taken at substantially the same time, i.e. within a time period of at most 50 ms or even at most 10 ms.

Labelled datasets are particularly valuable for training NNs.

According to embodiments, a gaze-related parameter determination unit, in particular a respective unit of the respective head-wearable device is used to determine the respective given or resulting value of the gaze-related parameter, in particular the respective given or resulting gaze direction and/or the respective given or resulting gaze point for the respective user.

According to other embodiments, a gaze-related parameter determination unit is part of a mobile computing device (companion device) connectable to the head-wearable device, for example a smartphone or tablet.

In one embodiment, a scene camera of the head-wearable device arranged to capture a given object in the field of view of the respective user wearing the respective head-wearable device is used for capturing images which can be used as a basis for determining a respective resulting value of the gaze-related parameter.

The resulting value(s) of the given gaze direction and/or the given gaze point in the co-ordinate system fixed with the respective head-wearable device may be determined using a field image (scene image) of the user's field of view (FOV) when the respective user is expected to gaze at the respective given object, into the respective given direction and/or at the respective given gaze point.

The scene camera may be removably connected with the spectacles body of the respective head-wearable device. Accordingly, the scene camera may be removed from the respective head-wearable device when no longer needed for calibration or determination of the gaze-related parameter(s), for example when only the pupil size or the pupil diameter is to be determined as e.g. in pupillometry used in clinical neurology and psychology. This typically improves the user comfort, in particular when used as normal glasses or sun glasses, and renders the head-wearable device unobtrusive which can be advantageous in studies of gaze-related parameters which include interactions of the wearer of the head-wearable device with other humans whose behaviour shall not be influenced by the head-wearable device.

Furthermore, determining and storing the resulting value(s) in the co-ordinate system fixed with the respective head-wearable device facilitate their later use.

Determining the resulting value(s) may be achieved using state-of-the-art machine learning, computer vision or image recognition techniques.

Of course, it is assumed that the user(s) operates in a cooperative manner. Such behaviour can be assumed, as each user has an interest in improving the accuracy and robustness of the predictions of the NN which is trained/retrained using the database, and thus depend on the quality of the datasets provided by the user(s).

For reasons of accuracy, the scene camera may have a resolution of at least 640×480 pixels or at least 800×600 pixels, more typically of at least 1024×768 pixels, and even more typically of at least 1280×1024 pixels or at least 1920×1080 pixels (at least VGA or even SVGA).

Different to the scene image(s), the resolution of the left and right images is typically comparatively low. The pixel number of the left images and of the typically equally sized right images may be at most 40000, particularly at most 10000, particularly at most 5000, and more particularly at most 2500 or even 1000.

Even with low resolution grayscale left and right images of 64 times 64 pixels, 50 times 50 pixels or even only 32 times 32 pixels a surprisingly high reliability of gaze direction/gaze point prediction can be achieved using trained NNs.

In fact, the gaze direction/gaze point may be accurately detected in many cases even if the left image or the right image or even both images do not contain a pupil or only a portion of the respective pupil.

A right IR-light source of the respective head-wearable device may be used to illuminate the right eye of the respective user and a left IR-light source of the respective head-wearable device may be used to illuminate the left eye of the respective user in embodiments referring to IR-cameras for the left and the right eye, respectively. IR-illumination may only be used/invoked when the image quality is too low or expected to be low, for example in a dark environment. IR-illumination may also be on permanently, or always be on and only switched off to save power and/or when image quality is sufficient without illumination.

Generating or adding the dataset may include concatenating the respective left image and the respective right image. Note that concatenated images may be presented directly to a 2-dimensional input layer of the NN.

Furthermore, generating or adding the respective dataset may include storing a respective representation of a further gaze-related parameter different to the gaze-related parameter, a respective user ID, a respective user-group ID and/or a device ID of the respective head-wearable device. The respective user-group ID may also be part of the user ID.

Storing the respective user ID, the respective user-group ID and/or the device ID of the respective head-wearable device in the datasets of the database may facilitate training the neural network in a device specific, user specific and/or user group specific manner.

For example, the neural network may be trained specifically for children, adults, elderly people, people of a common ethnic origin, women, men, a group of people with common background, a group of people in medication or on a drug, such as alcohol, or visually or otherwise impaired people, a particular device, device class, user ID, user group and the like.

Typically, the database contains respective datasets of a variety of users, states of the users, lighting conditions (indoor and/or outdoor lighting conditions), slippage states of the worn head-wearable device, and/or different distances between the user and a presented object at which the user is gazing.

According to an embodiment of a method for training a neural network, in particular a convolutional neural network, the method includes providing a database having a plurality of datasets each including a respective left image, a respective right image and a respective corresponding representation of a gaze-related parameter, in particular a respective corresponding value of the gaze-related parameter. A neural network having a given architecture is provided. Parameters of the neural network are determined using the respective left images and the respective right images of a sub-set or of all datasets as input and the respective corresponding representations of the gaze-related parameter of the sub-set or of all datasets as desired output of the neural network.

For sake of clarity, the method for training the neural network is also referred to as training method.

According to an embodiment, a trained neural network, i.e. a neural network trained with all or selected datasets of the database, is used to predict a user's gaze-related parameter, in particular a user's eye gaze direction and/or a user's eye gaze point, when the user is wearing a respective head-wearable device, from a left image generated by the first camera and a right image generated by the second camera of the respective head-wearable device, typically in real-time.

As already mentioned above, the training method may be user or user group specific.

Accordingly, a particularly high reliability and/or accuracy of neural network predictions may be achieved for the user or the user group.

Furthermore, the trained neural network may be used to determine a further gaze-related parameter, an ocular parameter and/or a physiological parameter of the user.

For example, the trained neural network may have been trained to detect based on the left and right images if the user is (getting) tired, mentally distracted, and drunken or the like.

The described calibration method may be at least partly performed and/or controlled by one or more processors of the respective head-wearable device such as a spectacles device as described herein, a goggles, an AR head-wearable display, and a VR head-wearable display, or by one or more processors of a local computer connected with the head-wearable device or a mobile computing device (companion device) connected with the head-wearable device, for example a smartphone or tablet.

The described calibration method may be invoked when a new user is wearing the head-wearable device for the first time, from time to time, when a slippage of the head-wearable device is likely, expected or detected, or on request of the user.

Any of the head-wearable devices described herein may be used for detecting one or more gaze-related parameters.

In one embodiment, the first and second cameras may be located within a range of 32 to 40, preferably, 34 to 38, in particular 36, degrees with respect to the median plane of the head-wearable device.

In another embodiment, the first and second cameras are located within a range of 114 to 122 degrees, preferably 116 to 120, preferably 118, with respect to the median plane of the head-wearable device.

In both embodiments, the typically tiny cameras are not even noticed by the user when wearing the device.

For example, the first and second cameras may have respective volumes of less than about 40 mm$^3$ or even 10 mm$^3$.

The head-wearable device may be part of a system capable of improving the parameter prediction of users over time.

Since the scene camera may be removed for applications not using the scene camera and when the spectacles device is used as a normal pair of spectacles, the comfort of wearing may be increased. Note that the scene camera is typically larger and heavier compared to the typically integrated (low-resolution) left and right cameras.

Placing the left and the right camera in the respective lateral portion of the spectacles body allows for a very discrete and non-obtrusive camera arrangement in the spectacles body without noticeably obstructing the visible field of the user, and ensures a beneficial view on to the eyeballs of the user.

Even further, arranging the left and the right camera in the respective lateral portion (instead of in the nose bridge portion) has the benefit that the nose bridge portion can be kept free of additional electronics and thus can be redesigned easily to adapt to different physiognomies/ethnically differing spectacle requirements, while the lateral frame portion can stay unchanged.

In addition, the lateral portion of the spectacles body provides more space for the cameras and (illumination) electronics compared to the nose bridge portion.

The cameras and (illumination) electronics may represent heat sources, but can be kept farther away from the eyes compared to arranging them in the nose bridge portion. Accordingly, wearing comfort may be further increased even if the heat sources are comparatively weak.

Furthermore, the typically symmetric placement of the left camera and the right camera with respect to the middle plane results in an improved capability of determining gaze-related parameters of the user, in particular in difficult light conditions.

The scene camera is typically removably mounted to the left lateral portion and/or the left holder, in particular a portion of the left holder next to the left lateral portion, or the right lateral portion and/or the right holder, in particular a portion of the right holder next to the right lateral portion.

The scene camera may be removably mountable to the left lateral portion and/or the left holder and to the right lateral portion and/or the right holder.

The head-wearable spectacles device may even have two scene cameras, a left scene camera removably mounted to the left lateral portion and/or the left holder, and a right scene camera removably mounted to the right lateral portion and/or the right holder.

Similar to the left and right cameras, the left and right scene camera are also typically mountable to the spectacles body/arranged mirror symmetric with respect to the middle plane.

Using two scene cameras allows for a higher resolution and/or accuracy. Further, it may be easier to keep the center-of-gravity of the head-wearable spectacles close to or even at the middle plane.

Due to mounting the scene camera(s) laterally, the center-of-gravity of the head-wearable spectacles device is shifted dorsally. This increases comfort when wearing the device in comparison to a scene camera connected to the front part of the spectacles body.

With detached scene camera(s), the appearance of the spectacles device may be very unobtrusive in comparison to a device with visible connectors on the front part of the spectacles body.

In particular in embodiments referring to a magnetic connection between the spectacles body and the scene camera(s), detaching the scene camera sidewards can be achieved with a quick and simple hand movement with one hand. This reduces the risk of losing/unadvertently taking off the spectacles device in comparison to a device with the scene camera attached to the front part.

Alternatively or in addition, a mechanical snap-connection may be used between the spectacles body and the scene camera(s).

The scene camera(s) may have a plug fitting into a socket on the spectacles body for connecting to an internal bus of the head-wearable (spectacles) device.

The socket (and plug) may be designed such that, when the scene camera is removed, the socket looks like a design element of a normal spectacles device. Thus, the head-wearable spectacles device may be worn and operated particularly unobtrusively.

The corresponding plug of the scene camera may have spring-loaded electrical contact pins for power supply and data exchange via and/or with internal bus of the spectacles device.

Typically, the head-wearable (spectacles) device has a connector for (external) power supply and/or data exchange, more typically a connector for power supply and data exchange, in particular an USB-connector such as an USB-C-connector.

The connector for power supply and/or data exchange may also be a connector for another external computer bus, in particular a computer bus and power connector such as a Thunderbolt-connector (Thunderbolt 3 uses USB-C connectors) or a Lightning connector (typically supporting the USB-protocol) or even an Ethernet-connector (Power over Ethernet).

The connector for power supply and/or data exchange is typically configured for magnetically attaching a corresponding cable such as an USB cable that may be used for connecting the head-wearable spectacles device to a companion device, such as a tablet or smartphone.

In one embodiment, the head-wearable (spectacles) device is provided with electric power from the companion device during operation of the spectacles device.

In this embodiment, the head-wearable spectacles device may not have an internal energy storage such as a battery. Accordingly, the head-wearable (spectacles) device may be particularly lightweight. Further, less heat may be produced during device operation compared to a device with an internal (rechargeable) energy storage. This may also improve comfort of wearing.

In other embodiments, the head-wearable (spectacles) device may have a lightweight (typically less than 50 g or even 20 g or even 10 g or even 5 g) internal energy storage with a low capacity of typically not more than 200 mAh, in particular not more than 100 mAh, in particular not more than 40 mAh for feeding an internal clock, supplying the electric components of the head-wearable (spectacles device) with electric power for a short time of typically at most one min, saving the images, and/or shutting down the head-wearable (spectacles) device in case the connection to the companion device is lost or the companion device is running low of energy.

The connector for power supply and/or data exchange is typically arranged at a dorsally pointed end of the left holder or the right holder.

Having both the scene camera(s) as well as the USB-cable connectable magnetically and removably to the spectacles body provides an eye tracking head-wearable (spectacles) device which is both simple and quickly to set up for the user.

Surprisingly, both the scene camera(s) and the USB cable can be detached and attached with a single hand, by a movement which does not risk tearing the head-wearable (spectacles) device off the head of the wearer. This is partly due to the typically used magnetic connection and the particular placement of the connectors (laterally for the scene camera and dorsally at the temple end for the USB cable), and partly due to the increased mechanical stability of the typically used hinge-free construction of the spectacles body.

The latter makes it also possible to construct the spectacles body out of only two parts (that may be manufactured in a 3D-printing technique), while still unobtrusively and safely or even optimally encapsulating all electronic components and protecting them against dust and moisture.

The hinge-free construction of the spectacles body also contributes to an increased mechanical stability and a highly reproducible scene camera position with respect to the left and right (eye tracking) cameras, taken on its own and in particular in combination with the magnetic connector and the plug/socket electrical connection between the scene camera(s) and the spectacles body which allows only one position of the scene camera on the left side and/or the right side. For devices in hinge design, such an advantageous fixed geometric relationship of the scene and eye tracking cameras is difficult to achieve unless the scene camera is built in non-removably into the frame, which in turn increases the bulkiness of the device and prevents it from being used and perceived as a normal pair of spectacles.

Further, any slippage of the head-wearable spectacles device on the head of the wearer is typically also reduced using the hinge-free construction. This is advantageous for eye tracking accuracy and consistency over time.

Having the scene camera attached at the ventral (forward) end of the left (or right) temple and/or the left (or right) lateral portion, and the USB cable at the dorsal (backward) end of the diametrically opposite right (or left) temple provides for additional weight balance and thus wearing comfort.

The wearing comfort may be increased by placing neither the scene camera nor the left and right (eye tracking) cameras in close proximity of the skin, by not integrating an internal energy storage like a battery in the spectacles body, but supplying energy via the connector for power supply and/or data exchange, and by not performing complicated calculations on a chip integrated in the spectacles body (all of which produce/s heat) but performing complex calculations, in particular calculating gaze-related parameter(s) of a user externally, in particular on a wearable companion device, such as a smartphone.

Accordingly, an integrated control and/or processing unit of the head-wearable (spectacles) device may only be configured for pre-processing the left and the right images from the respective eye tracking cameras and/or the images from the scene camera but not for calculating gaze-related parameter(s) using a neuronal network, in particular a convolutional neuronal network.

The integrated control and/or processing unit typically includes an interface board (interface controller) for communicating with the companion device, for example a USB-hub board (controller).

In some embodiments, the integrated control and/or processing unit may also only be implemented as control unit which is not configured for processing the images or only configured for pre-processing the images from the device cameras.

In other embodiments, the integrated control and/or processing unit may be implemented as control and processing unit also configured for calculating gaze-related parameter(s) of the user, typically even in real time or near real time, i.e. at most within 100 ms or 50 ms, more typically at most 20 ms or even at most 5 ms.

The control and/or processing unit of the head-wearable (spectacles) device is typically arranged non-visible within the spectacles body, in particular in the left lateral portion, in the right lateral portion, in the left holder and/or in the right holder. The control and/or processing unit (controller) of the head-wearable (spectacles) device may comprise several interconnected parts arranged in different portions of the spectacles body, for example also in the spectacles frame.

In particular, the control and/or processing unit may have several rigid and/or flexible printed circuit boards which are connected with each other via respective bus connectors and cables implemented in flex circuit technology.

Thereby the production of the head-wearable (spectacles) device can be simplified, in particular if the spectacles body is constructed in two parts which are shell-shaped at least in sections for accommodating the printed circuit boards, bus connectors and cables of the control and/or processing unit.

Accordingly, the spectacles body is typically formed by a first part and a second part which form together the frame, the left lateral portion, the right lateral portion, the holders, and respective grooves for lenses, but without hinges for the holders.

More typically, the first part forms an inner part of the spectacles body and the second part forms an outer part of the spectacles body partially surrounding the inner part when seen in a projection onto a first plane perpendicular to the middle plane and/or when seen from above.

The outer part may even partially surround the inner part when seen in a projection onto a second plane perpendicular to the middle plane and the first plane.

Typically, a positive connection, a mechanical snap-connection and/or a magnetic snap-connection is formed between the first part and the second part. Accordingly, the assembly of the head-wearable (spectacles) device may be facilitated.

Furthermore, the first part and the second part may be efficiently made using an injection molding or a 3D-printing technique.

Accordingly, the first part and the second part may be structured in layers.

Further, the first part and the second part may be made of a somewhat flexible material such as laser sintered polyamide (e.g. PA12 or PA11) allowing an often desired flexibility of the holder (temple arms).

The control and/or processing unit of the head-wearable (spectacles) device may have a USB-hub board and a power-IC connected with the connector for power supply and/or data exchange, a left eye camera controller board connected with the left camera, a right eye camera controller board connected with the right camera, an optional scene camera controller board connected with the scene camera (more typical the scene camera controller board is integrated into the scene camera), an optional low power SoC (System-on-Chip) for controlling and optional pre-processing the images, and an optional head orientation sensor having an inertial measurement unit (IMU).

The low power SoC may have a CPU, RAM (Random-Access Memory) as well as non-volatile memory, such as ROM (read only memory), PROM (programmable read only memory) and flash memory, a DSP and/or even a GPU.

In embodiments in which the control and/or processing unit is also configured for calculating gaze related gaze-related parameters of the user in real time, the low power SoC has sufficiently powerful computational units that are typically specifically designed for neural networks.

With the help of the head orientation sensor (IMU), head pose measurements may be performed and a vestibulo-ocular reflex (VOR) may be assessed, e.g. by the low power SOC, more typically by the companion device. Accordingly, a compensating eye movement when the head is rotated can be taking into account for determining gaze-related parameter(s) of the user. Furthermore, a tapping of the user against the head-wearable (spectacles) device may be taken into account, in particular for controlling functions of the head-wearable device or a connected companion devices, or for controlling steps or phases of any of the methods and processes as herein described.

The inertial measurement unit (IMU) typically includes an accelerometer and a gyroscope (6-axes IMU) and may be configured to give relative head-wearable (spectacles) device orientation.

The IMU may further include a magnetometer (9-axes IMU) configured to provide an absolute orientation of the head-wearable (spectacles) device.

Further, the head-wearable (spectacles) device may have a left LED configured for emitting light visible for human eyes and arranged next to the left camera, and/or a right LED arranged next to the right camera and configured for emitting light visible for human eyes.

The left LED and/or the right LED may be used for providing visual feedback to the user, in particular regarding any of: any operational or error state of the device or any of its components, a data transfer or data connection condition, as a $3^{rd}$ party application controlled indicator (an app on the companion mobile phone may get access to the LED), a particular step or phase of any of the methods described herein, e.g. a calibration success/quality/validity or other calibration related method step, a quality measure of recorded images, a quality measure about one or more gaze related parameters determined by the companion device, a condition of the eye, e.g. a blink rate, an eyelid coverage of the eye, a drowsiness alert, and as a software-controlled attention seeking alert/indicator.

The left and right LEDs may be implemented as RGB-LEDs. This as well as using a left LED and a right LED facilitates coding of desired visual feedbacks.

Alternatively or in addition, a speaker of the scene camera may be used for providing audio feedback to the user.

The scene camera may be a camera for visible light, an IR-camera, a time-of-flight camera, or a combination thereof.

Further, the scene camera may have a microphone for receiving user feedback and/or voice commands that may be interpreted by the companion device.

Since the scene camera may be removed privacy requirements may be easier fulfilled.

The head-wearable (spectacles) device and the companion device may when connected with each other, in particular via an USB-connection, form a system for determining gaze-related parameters of the user.

Accordingly, the companion device is typically configured for controlling the head-wearable (spectacles) device, supplying power to the head-wearable (spectacles) device, receiving the scene image and/or scene videos, and receiving left images and right images or pre-processed scene images, scene videos, left images, and right images.

Further, the companion device is typically a mobile computing device, in particular a smartphone or a tablet.

Furthermore, the companion device typically has a processing unit configured to determine a predicted value of gaze-related parameter(s) of the user as an output of a neural network instance, in particular a convolutional neural network instance using the left image and the right image as input of the neural network instance when running in the processing unit. Using a trained convolutional neural network has been found to allow efficient determining of predicted values of gaze-related parameter(s) with a surprisingly high accuracy and reliability even when comparatively low resolution left and right images are used as inputs. For example, a mean angular prediction error of better than 2° was achieved for gaze directions and/or gaze points with low resolution grayscale left and right images as inputs of the trained convolutional neural network.

The processing unit of the companion device may have a hardware component particularly designed for running neural network instances. In particular, DSPs, one or more special purpose chips, and/or one or more GPUs may be used for gaze estimation using CNN based inference. Note that many modern smartphones and tablets are already provided with a powerful GPU which may be used for running neural network instances.

All this can be achieved with a lightweight, unobtrusive, very comfortable head-wearable (spectacles) device that may be comparatively easy and cost-effective manufactured and repaired (easy and quick assembly/disassembly is even possible for a normal user) and can even be used as normal glasses (with standard optical lenses) or sun glasses (with detached scene camera(s)) without being easily recognized as an eye tracking device.

Furthermore, no particular heat management, physical shields to protect the user, vents or the like are required.

Reference will now be made in detail to various embodiments, one or more examples of which are illustrated in the figures. Each example is provided by way of explanation, and is not meant as a limitation of the invention. For example, features illustrated or described as part of one embodiment can be used on or in conjunction with other embodiments to yield yet a further embodiment. It is intended that the present invention includes such modifications and variations. The examples are described using specific language which should not be construed as limiting the scope of the appended claims. The drawings are not scaled and are for illustrative purposes only. For clarity, the same elements or manufacturing steps have been designated by the same references in the different drawings if not stated otherwise.

With reference to FIGS. 1A to 1C, a generalised embodiment of a head-wearable spectacles device for determining one or more gaze-related parameters of a user is shown. In fact, with the help of FIGS. 1A and 1C a plurality of embodiments shall be represented, wherein said embodiments mainly differ from each other in the position of the cameras 14, 24. Thus, the spectacles device 1 is depicted in FIG. 1A with more than one camera 14, 24 per ocular opening 11, 21 only for presenting each embodiment. However, in this embodiment the spectacles device does not comprise more than one camera 14, 24 associated to each ocular opening 11, 21.

FIG. 1A is a view from above on said spectacles device 1, wherein the left side 10 of the spectacles device 1 is shown on the right side of the drawing sheet of FIG. 1A and the right side 20 of the spectacles device 1 is depicted on the left side of the drawing sheet of FIG. 1A. The spectacles device 1 has a middle plane 100, which coincides with a median plane of the user of the spectacles device 1 when worn according to the intended use of the spectacles device 1. With regard to user's intended use of the spectacles device 1, a horizontal direction 101, a vertical direction 102, 100, a direction "up" 104, a direction "down" 103, direction towards the front 105 and a direction towards the back 106 are defined.

The spectacles device 1 as depicted in FIG. 1A, FIG. 1B, and FIG. 1C comprises a spectacles body 2 having a frame 4, a left holder 13 and a right holder 23. Furthermore, the spectacles body 2 delimits a left ocular opening 11 and a right ocular opening 21, which serve the purpose of providing an optical window for the user to look through, similar to a frame or a body of normal glasses. A nose bridge portion 3 of the spectacles body 2 is arranged between the ocular openings 11, 21. With the help of the left and the right holder 13, 23 and support elements of the nose bridge portion 3 the spectacles device 1 can be supported by ears and a nose of the user. In the following, the frame 4 is also referred to as front frame and spectacles frame, respectively.

According to the embodiments represented by FIG. 1A, a left camera 14 and a right camera 24 can be arranged in the spectacles body 2. Generally, the nose bridge portion 3 or a lateral portion 12 and/or 22 of the spectacles body 2 is a preferred location for arranging/integrating a camera 14, 24, in particular a micro-camera.

The specific location of the respective camera 14, 24 can be provided by defining an angle of an optical axis 15, 25 of the respective camera 14, 24 with respect to the middle plane 100.

If a camera 14 or 24 is arranged in the nose bridge portion 3 of the spectacles body 2, the optical axis 15 of the left camera 14 is inclined with an angle α of 142° to 150°, preferred 144°, measured in counter-clockwise direction (or −30° to −38°, preferred −36°) with respect to the middle plane 100. Accordingly, the optical axis 25 of the right camera 24 has an angle β of inclination of 30° to 38°, preferred 36°, with respect to the middle plane 100.

If a position of a camera 14, 24 is located in one of the lateral portions 12, 22 of the spectacles body 2, the optical axis 15 of the left camera 14 has an angle γ of 55° to 70°, preferred 62° with respect to the middle plane, and/or the optical axis 25 of the right camera 24 is inclined about an angle δ of 125° to 110° (or −55° to −70°), preferred 118° (or −62°).

The spectacles device 1 of FIG. 1A stands for various embodiments, having different positions of the cameras 12, 24, for example that both cameras 14, 24 are located in the nose bridge portion 3, the left camera 14 is placed in the left lateral portion 12 and the right camera 24 is located in the right lateral portion 22, or that the left/right camera 14/24 is arranged in the nose bridge portion 3 and the right/left camera 24/14 is arranged in the right/left lateral portion 22/12.

In order to provide an additional or alternative specification for a location of a camera 14, 24 in the spectacles body 2, specific camera placement zones 17, 18, 27, 28 are defined, wherein a related technical teaching is in line with the upper specification using angles α, β, γ, δ of the optical axis 15, 25. Said camera placement zones 17, 27, 18, 28 are virtual areas projected in a vertical plane being perpendicular to the middle plane 100.

Furthermore, a bounding cuboid 30—in particular a rectangular cuboid—can be defined by the optical openings 11, 21, which serves four specifying positions of the camera placement zones 17, 27, 18, 28. As shown in FIG. 1A, FIG. 1B, and FIG. 1C the bounding cuboid 30—represented by a dashed line—includes a volume of both ocular openings 11, 21 and touches the left ocular opening 11 with a left lateral surface 31 from the left side 10, the right ocular opening 21 with a right lateral surface 32 from the right side 20, at least one of the ocular openings 11, 21 with an upper surface 33 from above and from below with a lower surface 34.

In case a left/right camera 14, 24 is arranged in the nose bridge portion 3, a projected position of the left camera 14 would be set in a left inner eye camera placement zone 17 and the right camera 24 would be (projected) in the right inner eye camera placement zone 27.

When being in the left/right lateral portion 12, 22, the left camera 14 is positioned—when projected in the plane of the camera placement zones—in the left outer eye camera placement zone 18, and the right camera 24 is in the right outer eye camera placement zone 28.

With the help of the front view on the spectacles device 1 depicted in FIG. 1B the positions of the eye camera placement zones 17, 18, 27, 28 are explained. In FIG. 1B rectangular squares represent said eye camera placement zones 17, 18, 27, 28 in a vertical plane perpendicular to the middle plane 100. Both inner eye camera placement zones 17, 27 start at a distance of 2 mm from the middle plane 100 to a distance of 14 mm in horizontal direction 101 towards the left/right direction.

In a vertical direction 102 the inner eye camera placement zones 17, 27 stretch out for 22 mm, beginning in a distance of 9 mm from the upper surface 33 down to a distance of 31 mm. Thus, the inner eye camera placement zones 17, 27 have a size of 12 mm in horizontal direction 101 and 22 mm in vertical direction 102.

The left and right outer eye camera placement zones 18, 28 are recently referenced to the respective left and right lateral surface 31, 32 of the bounding cuboid 30. Doing so, the respective outer eye camera placement zone 18, 28 starts in direction towards the middle plane 100 from a distance of 5 mm from the respective lateral surface 31, 32 and extents from there in opposite direction, away from the middle plane 100, up to a distance of 6 mm from the respective lateral surface 31, 32. Therefore, the respective lateral surface 31, 32 intersects with the respective outer eye camera placement zone 18, 28.

The size of the outer eye camera placement zones 18, 28 in vertical direction is preferably 28 mm to 30 mm.

As a preferred option, all embodiments of the spectacles device 1 as represented by FIG. 1A to 1C have in common, that no more than one camera 14/24 is associated to one of the optical openings 11, 21; hence the spectacles device 1 does only comprise two cameras 14, 24 to take a picture of a left and a right eyeball 19, 29.

The spectacles device 100 as shown in FIG. 1A comprises a processing unit 7 configured for processing the left and the right picture from the respective camera 14, 24 for determining the gaze-related parameter using at least one convolutional neuronal network. According to the present embodiments, the processing unit 7 is non-visibly integrated within the holder, for example within the right holder 23 or the left holder 13 of the spectacles device 1. According to a non-shown embodiment, a processing unit can be located within the left holder. As explained below with regard to FIG. 7A to 10D, the processing of the left and the right images from the cameras 14, 24 for determining the gaze-related parameter(s) may alternatively be performed by a connected companion device such as smartphone or tablet.

Figure 2A:
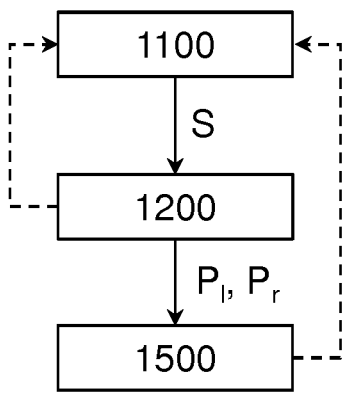
FIG. 2A illustrates a flow chart of a method for creating and updating a database for training a neural network according to embodiments.

With reference to FIG. 2A, embodiments of a method 1000 for creating and updating a database are explained. The database is typically used for training a neural network, in particular a convolutional neural network. This is explained below with regard to FIG. 3A in more detail.

In a first block 1100, a first stimulus S is presented to a user wearing a head-wearable device. The head-wearable device may be any of the head-wearable devices described herein. It may be implemented as a spectacles device, e.g. a glasses, a goggles, an AR head-wearable display, and a VR head-wearable display. The head-wearable device has a first camera arranged next to a left eye of the user and a second camera arranged next to a right eye of the user when the first user is wearing the head-wearable device.

The database may be used for training the neural network to predict the user's gaze-related parameter, in particular a user's eye gaze direction and/or a user's eye gaze point, when the user is wearing the head-wearable device, from a pair of a left image generated by the first camera and a right image generated by the second camera as input of the neural network.

Accordingly, the database may include a plurality of datasets including pairs of left and right images and one or more corresponding values of gaze-related parameters considered to be respective actual values or ground truth values.

The database may be user specific.

More typically, the database includes datasets of a plurality of users, i.e. of a first user, a second user, a third users, a fourth user and so on and so forth. For sake of clarity, the following description is mainly given for an exemplary user or first user.

Using datasets of a plurality of users for training the neural networks may enhance learning (generalization) and thus improve the accuracy and/or liability of the predictions of the NN.

Likewise, the database typically includes datasets obtained using several head-wearable device which are typically of the same type. At least the positions and alignments of the left and right camera of the head-wearable devices are typically at least substantially equal. Alternatively, the positions and alignments of the left and right camera of the head-wearable devices are also stored (coded) in the datasets and used as inputs for training the neural network.

In a subsequent block 1200, the first and second cameras of the head-wearable device record a respective image $P_l$, $P_r$, typically a respective photo, of the users left and right eye when the user is expected to respond to the first stimulus or expected to have responded to the first stimulus. The image $P_l$, $P_r$ may also be selected from a respective video stream or image sequence recorded using the first and second cameras.

In a subsequent block 1500, a dataset consisting of or including the left image $P_l$, the right image $P_r$ and a representation of a (desired) gaze-related parameter is saved (stored) in the data base. The representation of the gaze-related parameter may be a given or determined respective (ground truth) value of the gaze-related parameter, but also any other representation such as a corresponding image of a scene camera that is correlated with the first stimulus and suitable for determining the (ground truth) value of the gaze-related parameter.

In one embodiment, the user wearing the head-wearable device is requested in block 1100 by an acoustic stimulus, a visual stimulus or a combination or sequence of acoustic and visual stimuli, to look at (gaze at) a given object in his field of view (FOV), in particular on an object typically having eyes, for example a head, which is displayed on a display of a companion device and performs a not translatory movement on the display.

The given object might also be a real object in the user's FOV such as a finger tip of the user. However, instructing the user to mimic the movements of an anthropomorphic object on the display is less error-prone and much simpler compared to teaching a user to move their head properly while gazing at their own finger tip.

The size of the given object should be sufficiently small and well defined in order to provide an unambiguous gaze target.

Accordingly, the co-ordinates and the direction of the given object in a co-ordinate system fixed with the head-wearable device and thus with the user's head is well enough defined to be considered as actual (or ground truth) values of the gaze point and gaze direction, respectively, of the user wearing the head-wearable device.

Cooperative behaviour of the user can be assumed, as the user has an interest in improving the accuracy and robustness of the predictions of the trained NN, i.e. a NN which is trained using and thus depending on the quality of the datasets in the database.

In one embodiment, more than one gaze-related parameter, for example two or three gaze-related parameters are added with the dataset to the database in block 1500.

For example, instead or in addition to actual values or other representations of a cyclopean gaze direction, values or other representations of respective gaze directions of one or both eyes, of pupil axis orientations of one or both eyes, of a 3D gaze point, or of a 2D gaze point may be added with the dataset to the database in block 1500.

As indicated by the left and right dashed arrows in FIG. 2A, the method 1000 may return to block 1100 for presenting a further stimulus or even the same stimulus again. Note that several datasets may be added in block 1500.

Presenting the same stimulus may be useful for statistical reasons, to obtain datasets under different conditions, for example for a fresh and a tired user or at different times and/or light conditions.

Furthermore, the stimulus may not be one-to-one related with the resulting value of the gaze-related parameter(s).

For example, the user may hold the finger in different positions with respect to the device defined co-ordinate system when requested to gaze at a tip of one of his fingers held in his FOV. Although the fingertip defines inter alia a respective resulting gaze direction relative to the co-ordinate system fixed with the head-wearable device, the actual value of the resulting gaze direction to be stored in the database may yet have to be determined. In these embodiments, a gaze-related parameter determination unit, may be used to determine an actual value of the gaze-related parameter, for example a resulting gaze direction and/or the respective resulting gaze point of the user, with an image or video provided by a scene camera arranged to capture the given object in the field of view of the user, typically a scene camera of or removably attached to the head-wearable device.

Based on the image(s) of the scene camera, the actual value(s) of the gaze-related parameter may be determined using known machine learning, computer vision or image processing techniques. This may be done locally, i.e. using one or more processors of a processing unit of the head-wearable device or of a typically more powerful local computer connected with the head-wearable device or using one or more processors of a typically even more powerful computing system also hosting the database. In the latter case, the dataset(s) may include the image(s) of the scene camera as representations of the gaze-related parameter(s).

For sake of clarity, the following description focusses on the (2D or 3D) gaze direction and the (2D or 3D) gaze point (determined in the co-ordinate system fixed with the head-wearable device) as gaze-related parameters. This is however to be understood as not limiting. The skilled user appreciates that other gaze-related parameters may be handled likewise. For example, the system may be used to assess cognitive load. Relative changes of pupil diameters as reflected in recorded images can be linked to some kind of cognitive load measure. Cognitive load itself may be determined via an additional device, such as an EEG, which serves as the label (ground truth). The dataset then consists of the respective images and said cognitive load measure.

Figure 2C:
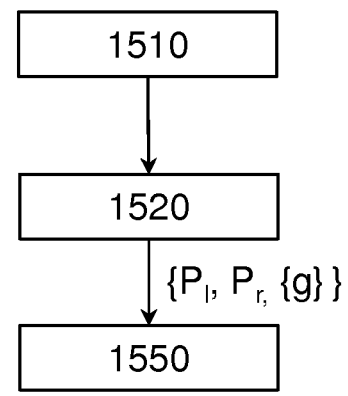
FIG. 2C illustrates a flow chart of a portion of the method shown in FIG. 2A and FIG. 2B, respectively according to embodiments.
Figure 2B:
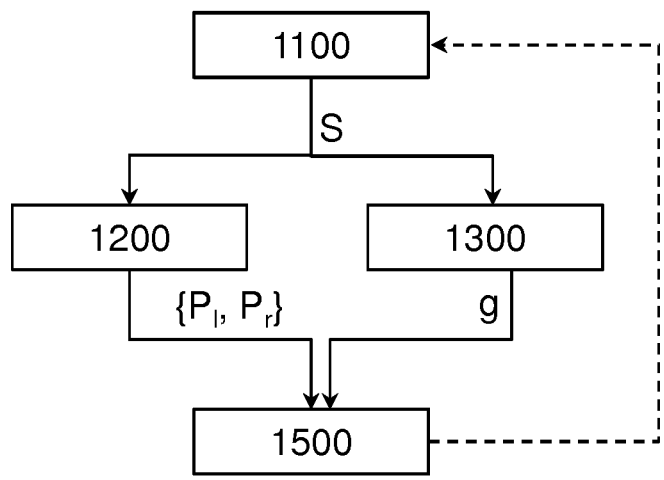
FIG. 2B illustrates a flow chart of a method for creating and updating a database for training a neural network according to embodiments.

Using a gaze-related parameter detection or determination unit of the head-wearable device for determining the actual value g of the gaze-related parameter is represented by a block 1300 in FIG. 2B illustrating a method 1001 which is apart from block 1300 typically similar to the method 1000.

In embodiments in which a screen of the head-wearable device is used for displaying objects for the user as stimuli, the actual value(s) g of the gaze-related parameter is typically known or given.

For example, the gaze point and/or the gaze direction of the object may, for a given head-wearable device, be calculated from the coordinates of the object on the screen. Alternatively, the gaze point and/or the gaze direction may be given in the co-ordinates of the co-ordinate system fixed with the head-wearable device and the screen, respectively, and the desired (2D) co-ordinates of the displayed object on the screen may be calculated prior to displaying the object on the screen.

With regard to FIG. 2C, an embodiment of the block 1500 as used in methods 1000 and 1001 is explained in more detail.

In a first sub-block 1510, a data connection is established between the head-wearable device and the database.

Thereafter or prior to block 1510, one or more dataset $\{P_l, P_r, \{g\}\}$ are generated in sub-block 1520. Each dataset may have a respective left image, a respective right image and a respective representation of one or more gaze-related parameters $\{g\}$ and correlated with a respective stimulus S.

In subsequent sub-block 1550, the one or more datasets $\{P_l, P_r, \{g\}\}$ are added to the database.

The datasets may include the pairs of left and right images as a respective concatenated image. Concatenated images can be presented to a 2-dimensional input layer of the NN. Accordingly, the pairs of left and right images may be typically concatenated in block 1520.

Different to the scene image(s), the resolution of the left and right images may be comparatively low. The pixel number of the left images and of the typically equally sized right images may be at most 10000, particularly at most 5000, and more particularly at most 2500 or less.

Even with low resolution grayscale left and right images of 64 times 64 pixels, 50 times 50 pixels or even only 32 times 32 pixels or only 24 times 24 pixels a surprisingly high accuracy (for example lower than 2° mean angular prediction error) and reliability of prediction gaze directions and/or gaze points can be achieved using trained CNNs.

Figure 3A:
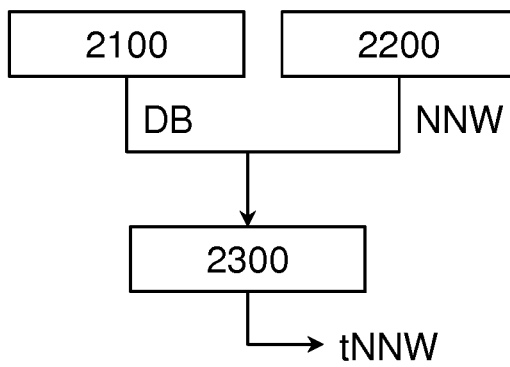
FIG. 3A illustrates a flow chart of a method for training a neural network according to embodiments.

With regard to FIG. 3A, a method 2000 for training a neural network is explained.

In block 2100, a database DB created and/or updated as explained above with regard to FIGS. 2A to 2C is provided. The database DB has a plurality of datasets each having a respective left image, a respective right image and a respective corresponding representation of a gaze-related parameter, e.g. a respective corresponding value of the gaze-related parameter.

Further, a neural network NNW with a given network architecture is provided in a block 2200. The provided neural network NNW is typically a convolutional NN.

The provided neural network NNW may be a previously trained NN.

Alternatively, the parameters (weights) of the provided neural network NNW may have been initialized with random values.

In block 2300, parameters of the neural network are amended using the respective left images and the respective right images of a sub-set or of all datasets as input and the respective corresponding representations of the gaze-related parameter of the sub-set or of all datasets as desired output of the neural network.

Block 2300 may include many teaching cycles each of which uses one or more datasets of the database DB.

Typically, a deep learning technique, in particular a gradient descent technique such as backpropagation may be used to train the neural network NNW in block 2300.

Finally, a trained or retrained neural network tNNW may be output and/or stored.

In particular, the determined weights of tNNW may be stored and typically later transferred to a processing unit of or connectable with a head-wearable device.

More typically, the determined weights of tNNW are (later) transferred to a plurality of respective processing units and/or head-wearable devices.

Thereafter, one or more local instances of the trained neural network tNNW may be used to predict gaze-related parameter(s) of a respective user, when the user is wearing a head-wearable device, from left and right images generated by the respective cameras of the head-wearable device, typically in real-time.

Figure 3C:
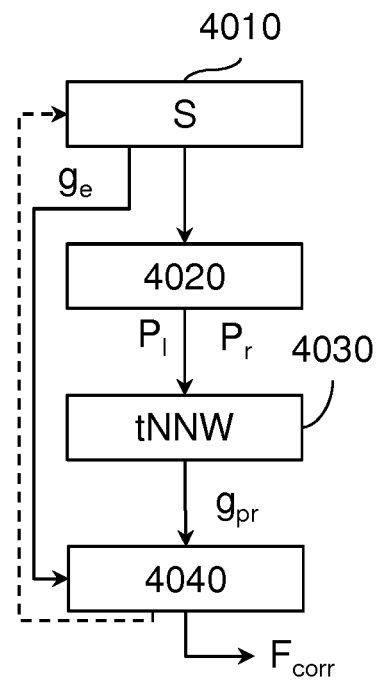
FIG. 3C illustrates a flow chart of a method for calibrating a head-wearable device according to embodiments.
Figure 3B:
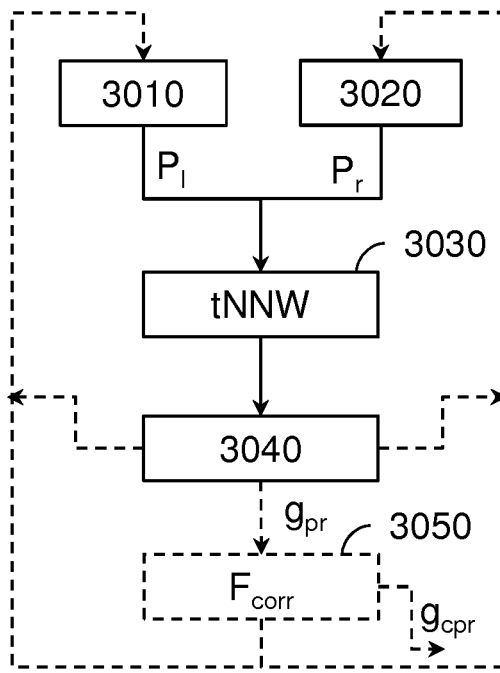
FIG. 3B illustrates a flow chart of a method for detecting one or more gaze-related parameters suitable for calibrating a head-wearable device.

As shown in FIG. 3B illustrating a detection method 3000, a left image $P_l$ of at least a portion of a left eye of the user may be taken by a first camera of a head-wearable device worn by the user, and a right image $P_r$ of at least a portion of a right eye of the user may be taken by second camera of the head-wearable device in blocks 3010, 3020.

The left image $P_l$ and the left image $P_l$ are typically taken at substantially the same time.

In a subsequent block 3030, the left image $P_l$ and the right image $P_r$ may be fed together as an input into a trained convolutional neural network tNNW, typically as a concatenated image to an input layer of the trained convolutional neural network tNNW.

In a subsequent block 3040, a predicted value $g_{pr}$ of one or more gaze-related parameters may be obtained from the trained convolutional neural network tNNW as a result of the left and right images input, typically as output of an output layer of the trained convolutional neural network tNNW.

The predicted value(s) $g_{pr}$ may be corrected using a user specific correction function $F_{corr}$ in an optional block 3050.

The predicted value(s) $g_{pr}$ or the corrected predicted value(s) $g_{cpr}$ may be output and/or used as input for an evaluation module, e.g. a user interface module using gaze-related user parameters.

After leaving block 3040 or block 3050, method 3000 may return to the blocks 3010, 3020 as indicated by the dashed arrows.

With regard to FIG. 3C, an embodiment of a method 4000 for calibrating a head-wearable device is explained.

In a block 4010, a stimulus S is presented to a user wearing the head-wearable device. The stimulus S is correlated with a desired (expected) value $g_e$ of a gaze-related parameter.

In a subsequent block 4020, the first camera and/or the second camera of the head-wearable device, typically both eye cameras are used to take a left image $P_l$ of at least a portion of the left eye of the user and/or a right image $P_r$ of at least a portion of the right eye of the user expected to respond (have responded) to the stimulus S.

Thereafter, a trained neural network tNNW, in particular a trained convolutional neural network, may be used to determine a predicted value $g_{pr}$ of the gaze-related parameter using the right and left images $P_l$, $P_r$ as an input for the trained neural network tNNW in a block 4030.

In a subsequent block 4040, a difference between the desired value $g_e$ and the predicted value $g_{pr}$ may be calculated and used to determine a correction function $F_{corr}$ for the user.

Typically, desired (expected) values $g_e$ are determined from field images recorded by a scene camera, in particular a scene camera of the head-wearable device and may thus be considered as ground truth values. This is explained in more detail below with regard to FIG. 9A to FIG. 9D.

As indicated by the dashed arrow in FIG. 3C, the correction function $F_{corr}$ is typically determined after several cycles.

Figure 3D:
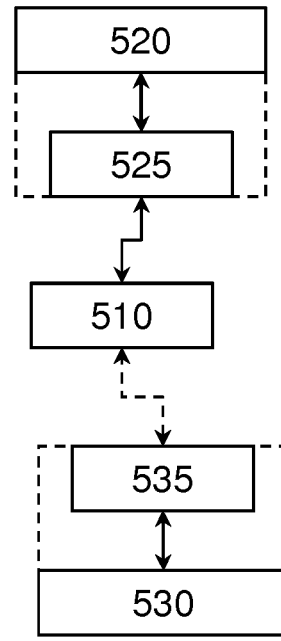
FIG. 3D illustrates a system for improving the prediction of gaze-related parameters according to an embodiment.

With regard to FIG. 3D, an embodiment of a system 500 for improving the prediction of gaze-related parameters is explained.

The system 500 has a computing system 510 hosting a database as explained herein. The computing system 510 may be implemented as/operate as or include a server for hosting the database. The computing system 510 may consist of a single or a plurality of connected computers.

The computing system 510 is configured to train a neural network using the database. For this purpose, the computing system 510 may have one or more hardware components which are particularly suited for realizing and training NNs, in particular CNNs such as GPUs.

In the exemplary embodiment, the computing system 510 is connected with a processing unit 525 connectable with or even forming a part of a head-wearable device 520 having a first camera for generating a left image of at least portion of a left eye of a user and a second camera for generating a right image of at least portion of a right eye of the user when the user is wearing the head-mountable device.

When connected with left and right cameras, the processing unit 525 is configured to receive the left and right images.

In addition, the processing unit 525 is configured to determine a predicted value of a gaze-related parameter of the user using the left image and the right image as input of a neural network instance, in particular a convolutional neural network instance when running in the processing unit.

The processing unit 525 typically also has one or more hardware components which are particularly suited for running NNs, in particular CNNs such as a GPU.

The processing unit 525 is typically configured to control and/or to execute the method 3000 explained above with regard to FIG. 3B.

Furthermore, the processing unit 525 is typically configured to control and/or to execute the method 4000 explained above with regard to FIG. 3C.

In the illustrated connected state, the processing unit 525 and the computing system 510 are configured to transfer datasets from the processing unit 525 to the computing system 510, to add datasets to the database, and to transfer parameters of the neural network from the computing system 510 to the processing unit 525.

The computing system 510 is typically connected with one or more further processing units 535 connected with or even forming a part of a respective further head-mountable device 530 each having a respective first camera and respective second camera.

The processing unit 525 may be operable as a client when connected with the computing system 510 operating as server.

Client(s) and server are typically remote from each other and typically interact through a communication network such as a TCP/IP data network. The client—server relationship arises by virtue of software running on the respective devices.

Typically, the communication between the processing unit 525 and the computing system 510 uses encryption.

The system 500 is at least in a connected state capable to execute any of the methods explained herein, in particular the methods 1000 to 4000.

Furthermore, the system 500 is typically also configured to execute any of the processes explained in the following.

Figure 4:
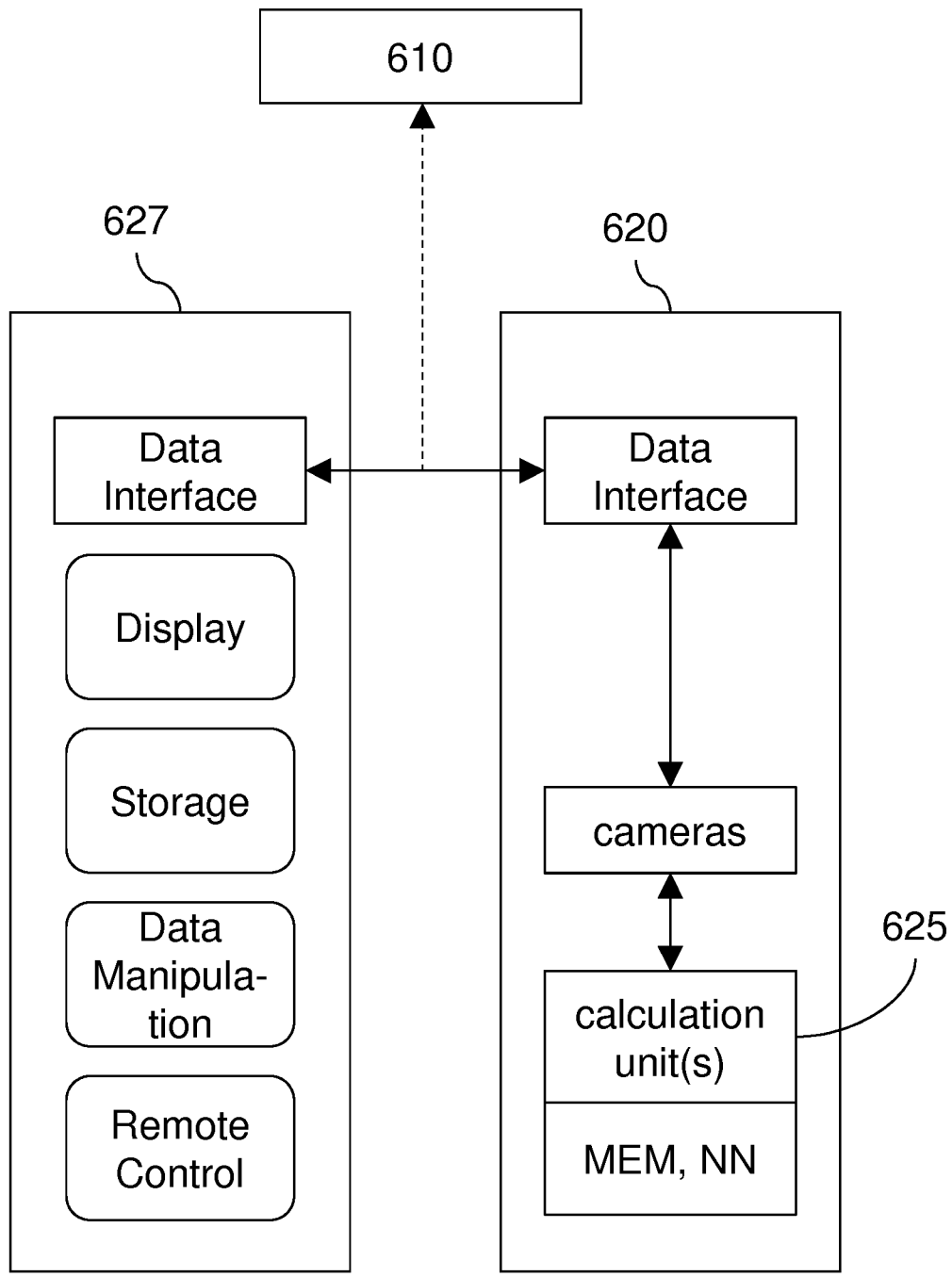
FIG. 4 illustrates a system for improving the prediction of gaze-related parameters according to an embodiment.

With regard to FIG. 4 an embodiment of a system 600 for improving the prediction of gaze-related parameters is explained. The system 600 is similar to the system 500 explained above with regard to FIG. 3D and also includes a computing system 610. For sake of clarity, only one head wearable device 620 is shown in FIG. 4.

In the exemplary embodiment, the head wearable device 620 can connect to an exemplary companion device, such as a tablet or smartphone 627 for control, power supply and (intermediate) storage of generated datasets. The companion smartphone 627 can also be used to upload collected labelled datasets and/or unlabelled datasets to the computing system 610 hosting the database, download (update) a used (convolutional) neural network when desired, as will be described in further detail with reference to FIGS. 5 and 6, and to interact with the user. The companion smartphone 627 may even be configured to run an instance of the (convolutional) neural network for determining gaze-related parameter(s) of the user. The communication connection between the smartphone 627 and the head wearable device 620 can be a magnetically attached USB 2.0 (or above) cable which exits the frame behind the left or right ear of the wearer and connects to the phone's USB-C port (see also FIG. 8A).

A companion app, i.e. a computer program designed to run on a mobile device such as a phone/tablet or watch (mobile app), running on the companion smartphone 627 can be the primary user interaction point. The user may be able to control recordings, user profiles, calibrations and validations via the companion app. The user may also be able to update and manage personal profiles, network models, and calibrations with the app. Such interactions may be low or minimal. The smartphone 627 is typically able to operate autonomously in a fully automated fashion. The companion app may control the device and may send firmware and model updates.

The head wearable device 620 may also include components that allow determining the device orientation in 3D space, accelerometers, GPS functionality and the like.

The head wearable device 620 may further include any kind of power source, such as a replaceable or rechargeable battery, or a solar cell. Alternatively (or in addition), the head wearable device may be supplied with electric power during operation by a connected companion device such as smartphone or tablet, and may even be free of a battery or the like.

According to an embodiment, the computation of the user's gaze point is done by a processing unit or controller 625 being fully and invisibly integrated into a standard spectacle frame of the device 620, one example of which is the Intel/Movidius Myriad2 VPU with CNN-inference capabilities. In this case, a trained CNN model may be loaded via the companion 627 and run on the integrated controller 625.

The controller 625 can receive respective images from the left and right eye cameras of the device 620, run inference using the trained CNN and sends the predicted gaze position data (or predicted values of other gaze-related parameters) to the connected companion smartphone 627 for display and storage.

The controller 625 may also forward the input image data from the eye cameras when requested, for example for data collection and/or use in a "refinery", as will be described below with reference to FIGS. 5 and 6.

The controller 625 may also send the images of a scene camera of the device 620 to the companion smartphone for display and storage. The latter function may be achieved by a separate special purpose controller that uses the same USB connection.

Alternatively, an on-device controller of the device 620 only controls the cameras and forwards the image data to the companion device 627 or even more remotely such as to the computing system 610, for example a remote server and/or cloud based structure or the like without doing any inference of the ocular parameter(s) on the user site.

Within the companion smartphone 627 one or more DSPs, one or more special purpose chips, like a System-on-Chip (SoC) and/or one or more GPUs may be used for gaze estimation using CNN based inference.

Irrespective of which device performs the task of determining the ocular parameter(s), the user may have access to gaze data and scene videos in real time for their use cases. The companion phone 627 or another mobile device can also act as a relay and allow the user to upload their recorded data to a destination of their choosing as well as upload the labeled training data to a server or servers, as will be described in the following.

Figure 5:
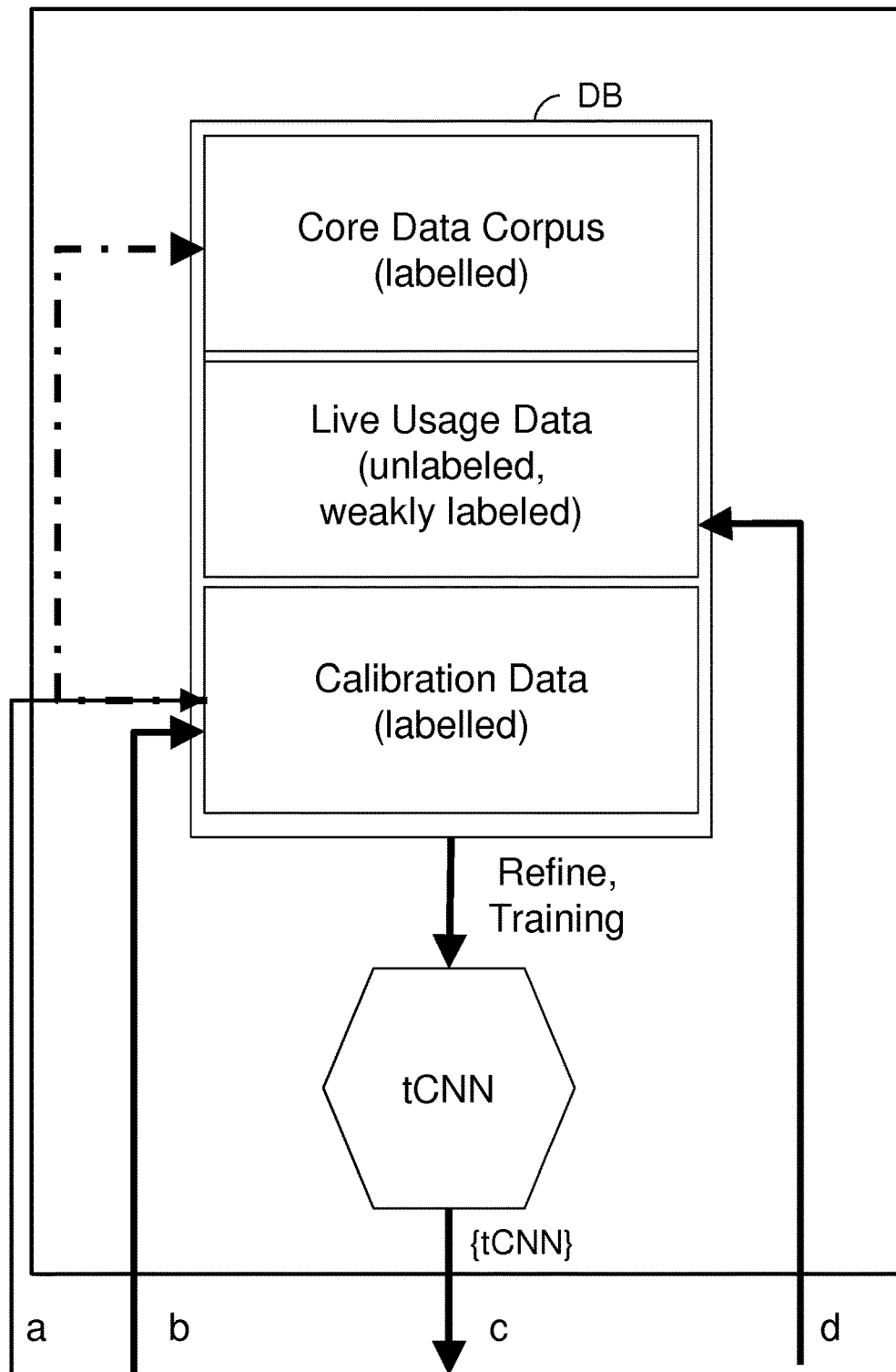
FIG. 5 illustrates a system for improving the prediction of gaze-related parameters according to an embodiment.
Figure 6:
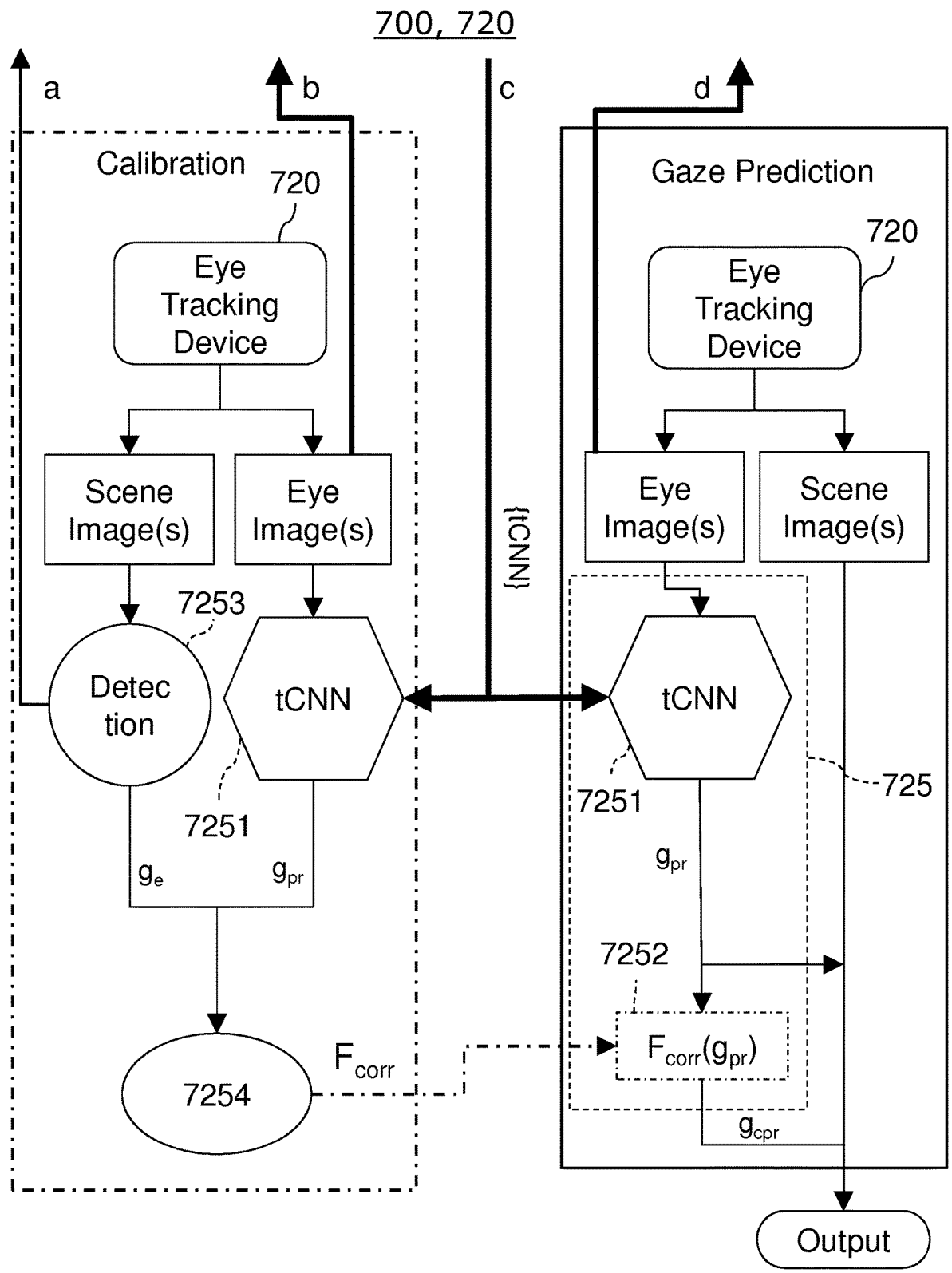
FIG. 6 illustrates a system for improving the prediction of gaze-related parameters according to an embodiment.

With regard to the FIGS. 5 and 6, embodiments of a system 700 for improving the prediction of gaze-related parameters are explained. The system 700 is typically similar to the system 500 and 600 explained above with regard to FIGS. 3D and 4, respectively, and also includes a computing system 710.

For sake of clarity, the system 700 and its operation is shown in the two FIGS. 5 and 6. FIG. 5 refers to the computing system 710. FIG. 6 refers to a head-wearable device 720 of the system 700 connectable with the computing system 710 (see also the arrows a-d representing flow of information).

One task of the present disclosure is to generate, provide, apply, and improve a so-called "universal neural network" (also referred to as universal NN-model and "cross-user NN-model") for determining ocular parameters, in particular gaze direction information of users. Such a universal NN is in its basic embodiment suitable for application as is, without any further calibration or setup steps by a "new" user, meaning a user whose datasets have not been used to train the NN.

It is thus assumed, that a so-called core data corpus of labelled datasets has been collected and stored in a database DB and a learning algorithm based on NNs has been trained based on said data.

The core data corpus can for example consist of datasets of image pairs picturing (respective portions of) the left and right eye and corresponding ground truth gaze points in scene camera image coordinates.

The core data corpus typically covers a large variety of naturally occurring appearances of the eyes. Thus, while recording training data special care may be taken to cover the entirety of possible appearance ranges of the eye images. This way it is made sure that the universal NN will work robustly on all images occurring in practice.

Factors that for example may be covered are different lighting conditions (in particular also outdoor lighting conditions), different poses of the headset (head-mountable device) on the user's head (to reflect headset slippage), differences in the physiological appearance of the user induced by for example gender or affiliation with an ethnic group, short-term physiological changes (e.g. on one day a user's eyes are more swollen or widely opened compared to another) and distance between gaze target and user as will be described in the following (different gaze distances lead to different levels of vergence of the eyes). Furthermore, the ground truth gaze points should correspond to objects at different distances from the user, to ensure that also a variety of different states of binocular vergence is present in the data corpus.

In addition, data augmentation methods may be used in order to further diversify the core data corpus and increase the amount of available data.

To further augment the amount of slippage configurations of the headset on a given user, slippage simulation has been found to be beneficial. Given a pair of eye images of the left and right eye together with the ground truth gaze label for that pair, samples of random movements which the headset might undergo due to slippage are generated. Given these movements and the fixed geometric relations between all cameras in the headset, projective transformations that produce the effect implied by the movements can be calculated. This way, valid additional samples of labelled datasets can be calculated without having to actually record them.

Similarly, random erasing in which randomly chosen regions in an image are erased and the corresponding pixels replaced with random values or a mean image pixel value produces images with various levels of simulated occlusion which can serve as additional "artificial" training datasets, which comes at no additional cost but adds to the diversity of the core data corpus.

A universal NN trained on such a core data corpus has then learned to produce or predict an output which encodes an ocular parameter, such as the gaze direction of any user. In one possible example, the output is given as 2D pixel coordinates of the gaze point in the scene camera image. Other encodings like for example the 3D location of the gaze point in some 3D coordinate system; or the 3D gaze ray in eye camera coordinates can be implemented as well.

In preferred embodiment, the system is binocular, i.e. its cameras capture (the state of) both eyes. A binocular capture is important (necessary in most cases) to determine the exact location of the gaze point, which can only be inferred from the binocular vergence of the eyes. With a monocular system one can only infer the 3D gaze direction of the user, but one cannot infer the precise depth of the gaze point. Given the 3D gaze direction one could also compute the exact gaze location by intersecting the gaze ray with the world geometry, assuming this geometry is known.

As to the NN model to be trained for use in the system and methods of the present disclosure, it has been surprisingly found that Convolutional Neural Networks (CNNs) are able to yield sufficient accuracy, despite the inherently challenging mobile respectively wearable setup of the device, which leads to low resolution of the input images and the challenging viewpoint of the unobtrusively placed optical sensor(s).

While CNNs have been used for tasks like object recognition where this can be beneficial, their use in end-to-end gaze prediction in a mobile setting has not previously been attempted. Given the great variety in image appearance in such a setting, leading to images which do not even always show the pupil or only show small fractions of the pupil, with large variations in lighting conditions and skin tone, it is unexpected that CNNs should be trainable to learn sufficiently meaningful convolution kernels to provide a universal cross-user model for accurate gaze prediction based on merely two low resolution input images.

By exploiting the use of CNNs in a mobile respectively wearable eye tracking setup, according to an important aspect of the present disclosure, a more unobtrusive device design and a more robust cross-user gaze detection is thus enabled (for example a mean angular prediction error lower than 2°).

The exact internal architecture of the network, i.e. the exact number, dimensions and sequence of convolutional and other layers has been found not to be very critical for the systems to work sufficiently well.

However, the network should preferably be highly efficient in order to allow for real-time interaction and embedded computation. Similarly, the precise individual values of the parameters which result from the training process influence the final accuracy of the trained network only to a small degree.

In particular network architectures optimized for small size or execution on mobile or embedded platforms have been found to be suitable. Candidates using CNNs thus include but are not limited to LeNet, SqueezeNet, MobileNet, Darknet, Resnet18 and any adaptations of these. Such network architectures are generally known and therefore need not be further described here in detail.

In a preferred embodiment, the neural network additionally uses one or more so-called "squeeze-and-excitation" (SE) blocks (layers). Such blocks perform feature recalibration. Input data or features U (W×H×C corresponding to image width×image height×number of channels) are first passed through a squeeze operation, which aggregates the feature maps across spatial dimensions W×H to produce a channel descriptor (1×1×C). This descriptor embeds the global distribution of channel-wise feature responses, enabling information from the global receptive field of the network to be leveraged by its lower layers. This is followed by an excitation operation, in which sample-specific activations, learned for each channel by a self-gating mechanism based on channel dependence, govern the excitation of each channel. The feature maps U are then reweighted channel-wise by these additionally learned parameters to generate the output of the SE block which can then be fed directly into subsequent layers.

Once, a core data corpus has been created and a CNN has been trained using the database DB (and the methods herein described), the parameters {tCNN} of the trained convolutional neural network tCNN can be uploaded to the memory of the head-wearable device 720.

FIG. 6 shows an exemplary flow of gaze direction prediction. The cameras of the device 720 record a live video stream of eye images, which are provided as an input data stream to a (integrated) processing unit 725, which uses a CNN-module 7251 to apply the trained network tCNN to the images (forward pass the images through the network tCNN) and thus calculates the predicted gaze direction $g_{pr}$. The optional scene camera can simultaneously record a video stream of images corresponding to part of the FOV of the user wearing the device 720. This video stream can be output by the device 720 together with the predicted gaze direction $g_{pr}$, or the gaze direction $g_{pr}$ can be output alone, via any of the device's data interfaces, or can be stored in the device memory. Thus, a compact, wearable and fully embedded device 720 for end-to-end gaze estimation results, which allows for accurate real-time inference of gaze direction directly on the device, by using a pre-trained and optimized neural network model. Note that at least a part of the functions of the processing unit 725 explained with regard to FIG. 6, in particular estimating gaze-related parameters, calibrating and applying (user-specific) correction functions for improving the accuracy may also be performed by a processing unit of a companion device connected with the head wearable spectacles device 720. Accordingly, the spectacles device 720 may be even more compact, more lightweight and/or even more comfortable for the user.

The simplest possible use scenario is thus that a user receives the device 720, puts it on and can start tracking without any further setup steps. The results could for example be relayed to and visualized in real-time on a local or remote device, such as a mobile phone, tablet, laptop, or any kind of visualization device. Visualization in the simplest case consists of displaying the video stream of the scene camera with the predicted gaze point indicated.

In a further embodiment, a calibration (left in FIG. 6, see also FIG. 3B, and in particular FIG. 9A to FIG. 9D, and FIG. 10B) and correction method (block 7252) as described herein may be performed for the user. Note that a calibration step may be optional, since the use of a trained CNN enables the wearable device 720 to work with sufficient accuracy in a calibration-free mode. However, performing calibration is able to produce further beneficial effects.

Firstly, such procedure can provide a simple user-specific correction function $F_{corr}$ which can be applied on-the-fly to the predicted gaze $g_{pr}$ which is output by the network tCNN, in order to further and instantaneously improve the accuracy achieved for that specific user. One possible example of correction functions are simple bivariate polynomials of adjustable degree. This correction could for example be applied either only during the present use session, or saved and applied also during subsequent use session of that user. The rationale behind such a procedure is that due to the physiology of the human eye, a universal network may hardly achieve 100% accuracy. For example, there exists a person-specific angle between the optical axis of each eye and the actual visual axis or line of sight of that eye. This angle is usually different in the left and right eye of a person, varies over the population and is per se unknown. In other words, a trained NN averages over this variation. Accordingly, a person-specific calibration is able to further increase the accuracy with respect to the predictions.

Secondly, datasets from one or more calibration methods performed by individual users can be used in conjunction with the existing core data corpus in various ways to improve the accuracy of the predictions.

For example, labelled calibration data from a specific user can be used to fine-tune the universal network into a personal network which then performs more accurate predictions for that specific user. This can for example be done by re-training or re-optimizing only parts of the neural network, i.e. only a subset of the entire parameters of the universal network, to better reproduce the ground truth of that specific user.

Thirdly, labelled calibration datasets from a plurality of different users can be added to the core data corpus itself over time (see the dashed-dotted arrow in FIG. 5) as more users use the devices 720 and perform calibration methods. The core data corpus can thus dynamically grow in volume, and the universal network can at intervals be refined respectively re-trained to provide an even more accurate universal neural network. This can be done from scratch using the increased training data volume, but with all model parameters re-initialized, or a re-training of the universal NN can use all of or part of the previous version of the parameters as initialization.

Thus, a threefold added benefit results: the calibration method can instantaneously improve the accuracy for a specific user by generating a correction function $F_{corr}$ to be applied to the prediction of the universal NN, one or more such procedures can also turn the universal NN into a more accurate personal model, and calibration methods performed by one or many users can even serve to improve the database DB and thus the universal NN, from which all users benefit immediately globally.

In an exemplary embodiment, a calibration method includes instructing a user wearing the device 720 to look at an object displayed on a display and to mimic a not translatory movement of the displayed object. Alternatively, the calibration method may include instructing a user wearing the device 720 to look at a particular known marker point, pattern or object in space. The coordinates of the displayed object, marker point, pattern and object in space, respectively, within the video images recorded by a scene camera connected to or provided by the device 720 can be precisely determined in an automated way by state of the art machine learning, computer vision or image processing techniques (block 7253 in FIG. 6). The image or images recorded by the cameras facing the eye(s) of the user are used to predict the user's gaze direction (gaze point) in block 7251. The offset of the predicted gaze direction (gaze point) $g_{pr}$ and the expected (ground truth) gaze direction (gaze point) $g_e$ defined by the object or marker position can then be calculated and used to generate a correction mapping or function $F_{corr}$ in a block 7254 to be applied henceforth (block 7252) to the prediction of the universal NN to arrive at a calibrated gaze-value $g_{cpr}$.

Alternatively to such an explicit calibration method, an implicit calibration method, like for example based on point-of-regard priors (e.g. mouse cursor on a computer screen) or saliency maps could be employed.

Possible use scenarios involving calibration are thus as follows.

At the first time a new user uses the device 720, the user can be given the possibility to perform a calibration, the result of which is used in all subsequent use sessions (once in a lifetime calibration). Alternatively, the user can be given the possibility to perform a calibration at the beginning of each new use session or at given time intervals, like e.g. on a daily basis.

Alternatively, the users can themselves invoke the calibration at their own volition. Furthermore, every time a user performs a calibration, the corresponding calibration datasets can be automatically sent to computing system 710 (when connected the next time). Accordingly, the computing system 710 can perform one of the refinement methods (updating the database DB, retraining the network tCNN) as described herein. This may be achieved in an anonymized way, since only the eye images and ground truth coordinates need to be transmitted.

The described calibration methods yield pairs of images labeled with the ground truth gaze location, which can be used to improve the universal NN as described above.

However, besides those labeled images it is optionally possible also to collect and store images in datasets obtained during everyday use. These datasets cannot be labelled with the ground truth gaze location, as this information is not available outside of calibration mode. However, a big corpus of unlabeled data still yields information about the contained image diversity. Techniques from the fields of unsupervised and semi-supervised learning can be utilized to source this information in order to improve the universal model or a person-specific model similarly to how it is described above.

To make it easier for a new user of the device 720 to use their person-specific model for gaze estimation along with other hyper parameters that might be set in their profile, it is possible to utilize automatic user identification and load the user's profile without them having to actively select it.

The user identification can be based on a separate learning-based algorithm. As training data for this algorithm one can use the available training data from all known users of a particular instance of a wearable device collected through either calibrations or during everyday use.

Since the number of regular users of one specific instance of a wearable device 720 is small, for example below 50, a simple off-the-shelf learning algorithm like a Support-Vector-Machine or a Random Forest is enough to train the user identifier.

Further, identifying the user also allows detecting a) new users that have not been calibrated before and b) when the current user has calibrated last. In both cases the user can then choose to perform a calibration, respectively the device can propose a calibration to the identified user.

The device can also be embodied in configurations other than in the form of spectacles, such as for example as integrated in the nose piece or frame assembly of an AR or VR head-mounted display (HMD) or goggles or similar device, or as a separate nose clip add-on or module for use with such devices. In this case the optical sensor feed could go into a multi-purpose computer vision processing chip that handles the CNN computation for gaze estimation alongside other tasks related to the AR/VR experience. This could also be a dedicated chip that does only (CNN-based) gaze estimation but the chip lives on and is powered by a PCB that hosts other HMD components as well. The system can thus also include a display device or screen for presenting information to the user. The methods described herein are applicable without adaptation to such an alternative device and/or system.

According to an embodiment, a system for improving the prediction of gaze-related parameters includes at least one head-mountable device and a computing system connectable with the at least one head-mountable device and configured to host a database. The at least one head-mountable device includes a first camera for generating a left image of at least portion of a left eye of a user and a second camera to generate a right image of at least portion of a right eye of the user when the user is wearing the head-mountable device. The computing system and the at least one head-mountable device are configured to upload datasets from the at least one head-mountable device to the first database and to download parameters of a neural network, in particular parameters of a convolutional neural network from the computing system to the at least one head-mountable device. The datasets includes a respective left image, a respective right image and a respective representation of a gaze-related parameter. The computing system is typically further configured to use the database for training the neural network and/or to determine the parameters of the neural network.

With reference to FIG. 7A to 8C, further embodiments of a head-wearable spectacles device 801 for determining gaze-related parameters of a user are explained. The spectacles device 801 is similar to the spectacles device 1 explained above with regard to FIG. 1A to 1C and also has a spectacles body with a middle plane 100, a nose bridge portion 3, a left lateral portion 12, a right lateral portion 22, a frame 4 forming a left ocular opening 11 at the right side 10 and a right ocular opening 21 at the right side 20 as illustrated in FIG. 7A to 7C showing a top view, a front view and a lateral view on the spectacles device 801, respectively.

The geometry of the spectacles device 801 may at least substantially correspond to the geometry of the spectacles device 1. For sake of clarity not all geometry related features are shown/provided with a reference numeral in FIG. 7A to 7C. In particular, the optical axes and angles of the left and right cameras 14, 24 with respect to the middle plane 100 are omitted. Note that the left camera 14 is hidden in FIG. 7C and therefore shown as dotted circle.

Further, the camera placement zones of the spectacles device 801 are also omitted but may be chosen with respect to the shown bounding cuboid 30 as explained above for the spectacles device 1.

The scene camera 806 for taking images of the user's field of view is however mounted to the left lateral portion 12 and the left holder 813, respectively, more particular removably connected with the left lateral portion 12 and the left holder 813, respectively, of the spectacles body 2.

For this purpose, two (permanent) holding magnets may be integrated into the spectacles body 2 which are not visible from the outside.

The two holding magnets 808 may act as counterparts for holding magnets of the scene camera 806 (of opposite polarity).

Further, a plug connection may be provided for electrical connecting the scene camera with the internal electronic components of the spectacles device 801.

Furthermore, the spectacles body 801 may also have on the right side a corresponding socket or a blind hole which is arranged mirror-symmetric to the socket 860 with respect to the middle plane to improve the symmetric appearance of the spectacles device without scene camera 806.

Alternatively or in addition, the scene camera 806 or a further scene camera may be removably mounted to the right lateral portion 22 and the right holder 823, respectively.

In the exemplary embodiment, the spectacles body 2 is made of two parts only, namely a first or inner part 8 and a second or outer part 9.

Accordingly, the holders 813, 823 merge without a hinge (seamlessly) into the respective lateral portion 12, 22.

Furthermore, the left camera 14 for taking left images of at least a portion of the left eye 19 of the user is typically arranged in the left lateral portion 12, in particular the left outer eye camera placement zone, and the right camera 24 for taking right images of at least a portion of the right eye 29 is arranged in the right lateral portion 22, in particular the right outer eye camera placement zone. In this embodiment the spectacles device 801 does not comprise more than one camera 14, 24 associated to each ocular opening 11, 21.

Typically, the left and right cameras 14, 24 are arranged mirror-symmetric with respect to the middle plane.

Figure 8A:
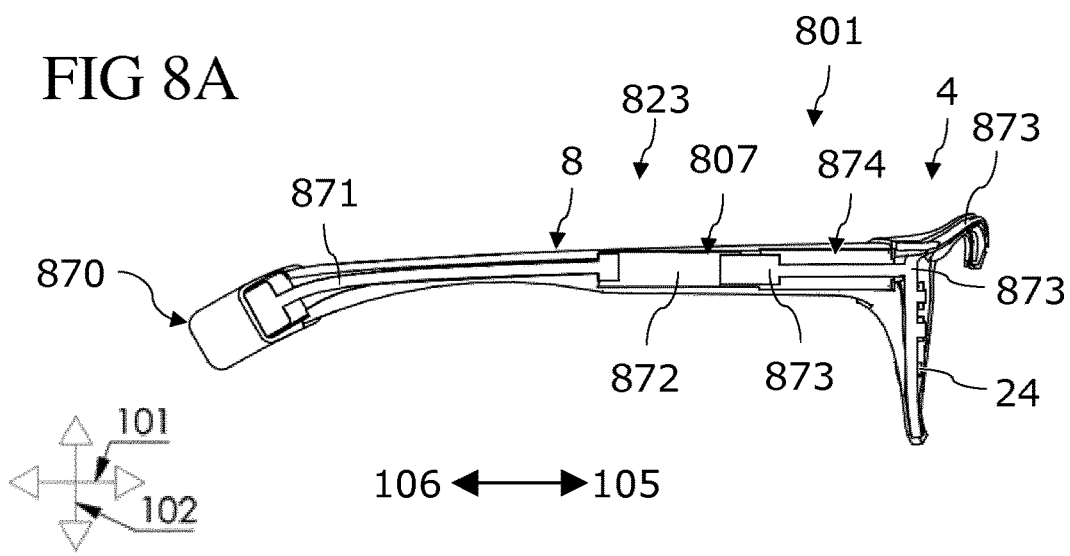
FIG. 8A is a further lateral view on the spectacles device according to FIG. 7A.
Figure 8B:
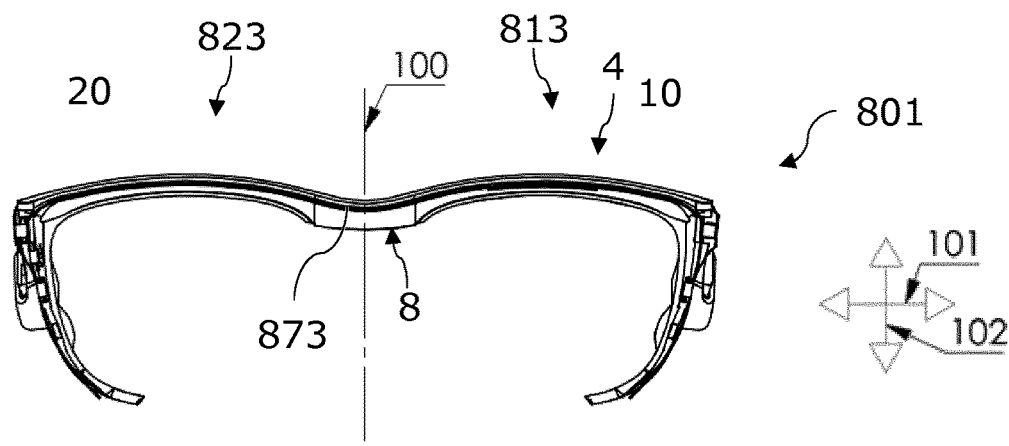
FIG. 8B is a further lateral view on the spectacles device according to FIG. 7A without the removable scene camera.
Figure 8C:
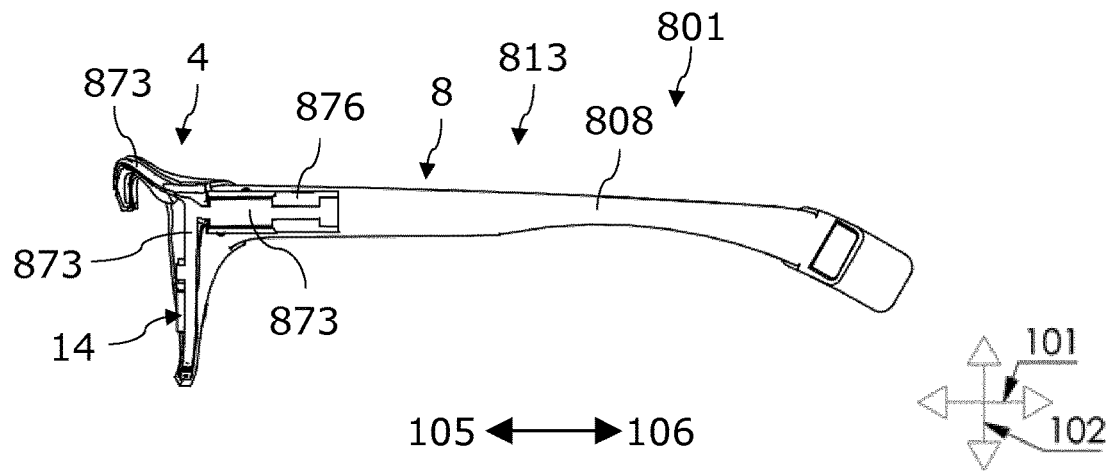
FIG. 8C is a lateral view on the removable scene camera of the spectacles device according to FIG. 7A.

FIGS. 8A to 8C are views on the inner part 8 of the spectacles body 2 of the spectacles device 801 with inserted electronic components 870 to 876. At least part of the electronic components 870 to 876 may be clamped to the inner part 8. For example, the inner part 8 and the outer part 9 may be snapped together after inserting the electronic components 870 to 876 to seal the inner electronic components 871 to 876 against moisture and dust.

In the exemplary embodiment, a USB-connector 870 for power supply by and data exchange with a companion device such as a smartphone protrudes dorsally outwards and slightly downwards from a dorsal end of the right holder 823 (portion of the inner part 8) of the spectacles device 801.

Typically, the USB-connector 870 is configured for magnetically attaching a USB cable for connecting to the companion device.

The USB-connector 870 is connected via bus connectors (not shown) and a flexible cable 871, in particular a flex circuit cable to a USB-hub board 872.

Typically, the flexible cable 871 and the USB-hub board 872 are implemented in flex circuit technology, in particular flex-PCB-technology. The USB-hub board 872 may however also be implemented as a non-flexible printed circuit board (PCB).

The flexible cable 871 may e.g. be made from flexible stranded insulated wire, flexible coaxial cables, or flexible circuitry (flex-PCB) based on Kapton or other polymeric material (flex circuit cable).

By using flexible cables (and boards), the position of the electronic components may easily be adjusted in or even clamped into the at least substantially shell-shaped inner part 8 without strain to the leads.

In the exemplary embodiment, the control- and/or processing unit 807 is implemented as control unit formed by the USB-hub board 872, a left eye camera controller board 874 and a right eye camera controller board 876.

The left eye camera controller board 874 and a right eye camera controller board 876 are connected with the USB-hub board 872 via bus connectors (not shown) and a flexible cable 873, in particular a flex circuit cable, which also runs from the left side 10 to the right side 20 as illustrated in FIG. 9B showing a front view on a front portion of the inner part 8 (inner part of the frame 4) with the inserted flexible cable 873.

The right eye camera controller board 874 is connected with the right camera 24 via a part of the flexible cable 873 or a further flexible cable.

Likewise and as illustrated in FIG. 8C showing a lateral view from the left on the inner part 8 of the spectacles body, the left eye camera controller board 876 is connected with the left camera 14 via a part of the flexible cable 873 or a further flexible cable.

In some embodiments, the unit 807 further includes additional boards flexibly connected with USB-hub board 872 and/or integrated on the USB-hub board 872.

For example, the USB-hub board 872 may include a power-IC and an inertial measurement unit.

Further, a low power SoC including a CPU, memory unit(s), a DSP and/or a GPU may be flexibly connected with the USB-hub board 872 or include a USB-hub controller.

With reference to FIGS. 9A to 10B, several methods for generating data using a head-wearable device as described herein are explained. The generated data may be used for calibrating the head-wearable device, generating and/or updating a database that may be used for training neural networks to extract gaze-related parameter(s), in particular gaze-direction related parameter(s) from images of the head-wearable device's eye camera(s), for determining a user's cognitive load, or even for other purposes like identifying a user.

FIG. 9A illustrates a user 90 wearing a head-wearable device 901 and holding a companion device 927 with a display 926 displaying a not translatory movement of an object 91. The head-wearable device 901 is typically similar to and may even be one of the head-wearable devices 1 and 801 explained above with regard to FIGS. 1A to 1D and 7A to 8C, respectively.

For sake of clarity, only a scene camera 906 of the head-wearable device 901 is shown in FIG. 9A. For the same reason, a (wired) connection such as an USB-connection between the head-wearable device 901 and the companion device 927, which is a tablet or smartphone in the exemplary embodiment, is also not shown. Furthermore, for sake of clarity, it is in the following assumed that the head-wearable device 901 has two eye cameras, one for each eye. Although this is a preferred embodiment, as it typically allows more accurate estimation of gaze-related parameters from the eye images, it is to be understood that the explained method steps may also be performed with images from one eye camera only.

As illustrated in FIG. 9A, the head-wearable device 901 may define a co-ordinate system, in particular a Cartesian co-ordinate system with three Cartesian coordinates x, y, z or a corresponding spherical co-ordinate system with radial distance r, polar angle $\vartheta$, and azimuthal angle $\varphi$.

FIG. 9A illustrates a situation after the user 90 has put on the head-wearable device 906, connected the head-wearable device 906 with the companion device 927 and started an app for generating data on the companion device 927 (companion app). The user 90 holds the mobile companion device 927 at arms-length with the display 926 facing towards them.

The companion app running on a processing unit 925 of the companion device 627 controls a not translatory movement(s) of a head 91 displayed on the display 926, a small humanoid head ("avatar") in the exemplary embodiment.

The head 91 is typically displayed in the center of the mobile device's display 926.

After optionally displaying a short instruction on the display 926 requesting the user 90 to mimic the head's movements and/or playing a respective voice message over a loudspeaker of the mobile device 927, the head 91 may start moving slowly, rotating a bit into different directions and around axes x", y", z" of a Cartesian co-ordinate system defined by the display 926, respectively, as indicated by the angles $\alpha"$, $\beta"$, $\gamma"$ in FIG. 9B. For sake of clarity, the Cartesian co-ordinate system x", y", z" is only shown in FIG. 9B.

FIG. 9B to FIG. 9D show respective top views on the display 926 of the companion device 927 including projections of the head 91 at three different times t1, t2, t3 during the rotational movements $\{\alpha"(t), \beta"(t), \gamma"(t)\}$ of the head 91. Two of the co-ordinate axes, for example the co-ordinate axis y", z" of the co-ordinate system defined by the display 926 may be parallel to the display's 926 display level (projection plane) and the third co-ordinate axes (x") may be perpendicular to the display level.

The user 90 mimics (mirrors) the movement $\{\alpha"(t), \beta"(t), \gamma"(t)\}$ of the head 91 with their own head, while gazing at the displayed head 91.

Users 90 will automatically focus their gaze on the displayed head 91, in particular its eyes typically mirroring the head's movement throughout the procedure. This is because the users 90 have to pay attention to the head's 91 movement $\{\alpha"(t), \beta"(t), \gamma"(t)\}$ in order to mimic it.

Therefore, one can thus use the positions of head 91 (e.g. its eyes or a (mid)point between its eyes) as measured in 2D scene camera image co-ordinates x(t), y(t) as time dependent ground truth gaze targets. Alternatively, the 3D position (co-ordinates x(t), y(t), z(t)) or directions $\vec{r(t)}$ of the head 91 may be determined by using a scene camera 906 which also provides depth information, such as an RGBD camera, and taken as time dependent ground truth gaze targets, e.g. in spherical co-ordinates (r(t), $\vartheta(t)$, $\varphi(t)$) with respect to the co-ordinate system defined by the head-wearable device 901.

Using a choreography with diverse enough head movements $\{\alpha''(t), \beta''(t), \gamma''(t)\}$ ensures that diverse gaze samples (e.g. ground truth values for the gaze angles ($\vartheta$, $\varphi$) with respect to the co-ordinate system defined by the head-wearable device 901) can be collected. The ground truth values can be allocated to corresponding first and second images recorded by the first and second eye cameras (not shown) of the head-wearable device 901.

The choreography $\{\alpha''(t), \beta''(t), \gamma''(t)\}$ displayed by the head 91 on the display 926 may intuitively define the required movements and the speed of those movements for the user 90 without requiring lengthy instructions.

The users may only be required to hold the mobile companion device 927 running the app at arms-length in front of themselves and mimic the movement of the displayed head with their own head while looking at it.

The choreography can be randomized every time it is executed, i.e. the exact movement the head 91 shown can be different every time. This ensures that users have to pay attention to the head 91 every time because they cannot foresee its movement.

After a short while of e.g. 5 to 15 seconds the head 91 may stop moving and the recorded data (eye images and allocated ground truth values for the gaze angles $\vartheta'$, $\varphi'$ or gaze-direction related parameter of the user 90) may be used for user-specific calibration.

In some cases, a preliminary un-calibrated gaze estimation might already be available during the calibration. This gaze estimation has some systematic error due to being uncalibrated, but it can provide a (rough) estimate. One can use this estimate to obtain the rough gaze path the user 90 has performed during generating the calibration data and can then compare this path to the path that the mobile companion device 927 and the displayed object 91, respectively, has traced in the field images of the scene camera 906. Both paths need to be highly correlated if the user 90 has actually been looking at the mobile companion device 927 and the displayed object 91, respectively. If the correlation falls below a given threshold, one can assume that the calibration data has not been determined correctly, discard it and ask the user 90 to repeat the procedure.

Furthermore, both the gaze path and the path of the mobile companion device 927 and the displayed object 91 in the field images, respectively, have to correlate with the choreography shown by the head 91 as well.

Using the collected datasets of ground-truth values of gaze-direction related parameter(s) and eye images, one may use any suitable strategy to optimize the gaze estimation algorithm to correctly predict gaze points based on the eye images. Thereafter, one can measure a calibration residual, i.e. the magnitude of the error the gaze estimation still makes on the calibration samples after calibration.

The parameterization of gaze estimation algorithms is often highly constrained. This implies that if one uses nonsensical data for calibration one will not be able to make the gaze estimation algorithm fit it with a low residual error. Thus one can further require the calibration residual to be below a respective given threshold in order to accept the calibration.

Furthermore, a reactive choreography of the not translatory movement based on user movement may be implemented.

Similarly to how the validity of a user's head movement during data generation/calibration can be checked by comparing the path that the mobile companion device 927 and the displayed object 91, respectively, take in the field images with the movement $\{\alpha''(t), \beta''(t), \gamma''(t)\}$ of the head 91 displayed on the display 926, the choreography can be made reactive.

For example, the head 91 could move one (time) step further, but then first wait for the user 90 to follow before proceeding further. This can ensure that the choreography $\{\alpha''(t), \beta''(t), \gamma''(t)\}$ is not shown too fast, if the present user is only able to execute the movements slowly.

Another form of reactivity can provide feedback about the desired or required extent of head rotation to be performed by the user 90 during the procedure.

For example, the head 91 can be initially set up to perform head rotations covering a certain standard angular range (on a unit sphere). As a user mimics/follows these movements, different users may interpret the amount of necessary head rotation differently: some may perform very small head rotations while others might try to perform very large rotations (while still being able to keep their eyes fixed on the avatar). The extent of head rotation a user 90 performs with respect to the display 926 and (avatar) head 91 or co-ordinate system x", y", z" respectively, can be measured using an IMU of the head-wearable device and/or by detecting the position of the mobile device 927 (the display 926 or head 91) within the scene camera images (field images), since the scene camera 906 is carried by the user's head. If the mobile device 927 (display 926 or head 91) stays too close to or even almost in the center of the scene camera images, the user performs rather small head rotations. In this case, the choreography could adapt itself to increase the amount of displayed head rotation (the angular range covered on the unit sphere) in an online/live manner in order to encourage the user to perform larger head rotations. This way it can be automatically ensured that a large enough range of head rotations and thus gaze angles is covered. Conversely, if the mobile device 927 (display 926 or head 91) moves close to the borders of the scene camera images (or even leaves the scene camera's FOV), this can be taken as an indication that the user performs too large head rotations and the not translatory movement of the head 91 may be adapted by decreasing the amount of rotation.

Furthermore, the generated data (datasets, pairs of eye images recorded by the eye tracking cameras of the head-wearable device optionally in conjunction with corresponding field images recorded by the scene camera and/or the ground truth values of gaze-direction related parameter(s) such as gaze points) can be used to add respective datasets to a database (corpus of data) which may be used to a train neural networks to provide a "universal" model, able to provide a fairly accurate un-calibrated gaze estimation for a new/any user from respective eye images.

FIG. 10A illustrates a flow chart of a method 5000 for generating data suitable for calibration of a head-wearable device. In a block 5010, a not translatory movement of an object is displayed on a display of a companion device as a stimulus S for a user to mimic the not translatory movement.

As explained above with regard to FIG. 9A to FIG. 9D, the object is typical a head (or a face) with two eyes looking straight ahead while the head follows a choreography of head rotations, typically about at least two axes of a co-ordinate system fixed with the companion device. This is indicated in FIG. 10A by the three angles $\alpha''$, $\beta''$, $\gamma''$ which are functions of time t, typically at least piecewise differentiable functions of time.

While displaying the not translatory movement of the object and the user wearing the head-wearable device is expected to look at and mimic the displayed not translatory movement, the scene camera of the head-wearable device takes field images $P_S$ of a field of view of the user and a first eye camera and a second eye camera of the head-wearable device take respective eye images $P_l$, $P_r$ of at least a portion of the user's left and right eyes in a block 5020.

In a block 5022, the positions of the object are determined, for example with respect to a co-ordinate system fixed with the head-wearable device (see also FIG. 9A), for example as 3D co-ordinates, or as 2D co-ordinates within the field image(s) $P_S$.

In a block 5025, the determined positions of the object may be used to determine for the eye images $P_l$, $P_r$ respective ground truth values of gaze-direction related parameter(s) of the user, which are denoted as $g_{gt}$, for example a 2D gaze point.

For user specific calibration, pairs of left and right eye images $P_l$, $P_r$ may be processed/analyzed, typically using a trained neural network for determining corresponding predicted values of gaze-direction related parameter(s) of the user, which are denoted as $g_{pr}$ in a block 5030. Note again that taking of only left or right images $P_l$, $P_r$ may be enough for calibrating.

In a block 5040, the ground truth values $g_{gt}$ and the predicted values $g_{pr}$ of the gaze-direction related parameter(s) may be used to determine a correction function $F_{corr}$ for the user and the head-wearable device (or device series).

The user-specific correction function $F_{corr}$ may be stored and later used to determine corrected values from the predicted values $g_{pr}$ for the particular user.

FIG. 10B illustrates a flow chart of a method 6000 for generating data suitable for calibration of a head-wearable device.

In a block 6005, a user wearing a head-wearable device is instructed to look at an object displayed on a display of a companion device and mimic a not translatory movement of the object to be started. For example, the user may be informed acoustically, e.g. via a speaker of the companion device, and/or visually, in particular by a short (one sentence) instruction displayed on the display.

During displaying the instructions, the object may perform a not translatory example movement. The user may then be asked to initiate collecting data, e.g. via a voice command or pressing a start button additionally displayed on the display.

Thereafter, the not translatory movement of the object is started on the display of the companion device in a block 6010. Block 6010 is typically similar to block 5010 explained above with regard to FIG. 10A.

In parallel, the scene camera of the head-wearable device takes field images $P_S$ of a field of view of the user and a first eye camera and a second eye camera of the a head-wearable device take respective eye images $P_l$, $P_r$ of at least a portion of the user's left and right eyes in a block 6020.

In a subsequent block 6027, datasets may be generated. Each dataset may include or consist of one eye image $P_l$, $P_r$, typically a pair of corresponding eye images $P_l$, $P_r$.

The datasets may also include respective field images $P_S$ of a field of view of the user recorded by the scene camera.

Alternatively or in addition, the datasets may also include a ground truth value $g_{gt}$ of at least one gaze-related parameter of the user, in particular a ground truth value $g_{gt}$ of at least one gaze-direction related parameter of the user.

For example, ground truth values $g_{gt}$ of gaze-direction related parameter(s) of the user may be determined from the field images $P_S$ in a block 6025 which is typically similar to block 5025.

As indicated by the dashed-dotted arrow in FIG. 10B, the datasets may be generated during displaying the not translatory movement of the object (on the fly) or thereafter.

After establishing a data connection to a computing system configured to host a first database in a block 6007, the datasets may be added to the first database.

Similar as explained above with regard to block 5040 in FIG. 10A, the datasets including (a) respective ground truth value(s) $g_{gt}$ of gaze-direction related parameter(s) or (a) respective field image(s) $P_S$ may be used for user-specific calibration of the head-wearable device.

The processes explained above with regard to FIG. 10A and FIG. 10B may be controlled by a companion app running on the companion device connected with the head-wearable device, for example via a USB-connection, and optionally communicating with a computing system configured to host a database for the generated datasets, for example via a TCP/IP-connection. For example, a control and/or processing unit of the companion device may operate as a primary master controlling a control- and/or processing unit of a head-wearable device operating as a secondary controller when the companion app is running.

Alternatively, the companion app may be controlled by the processing unit of the head-wearable device which operates as the primary controller in this embodiment.

FIG. 10C illustrates an eye tracking system 900 that may perform any of the methods explained herein. The exemplary eye tracking system 900 is shown in a state in which a head-wearable device 901 as explained herein and a companion device 927 as explained herein are connected with each other via a link for data exchange, more typically via a link for data exchange and power supply (of the head-wearable device 901), for example via a USB-link. On a display (typically a screen) of the companion device, a not translatory movement of an object may be shown. The head-wearable device has a first eye camera for taking first (eye) images of at least a portion of a first eye of a user wearing the head-wearable device, and a scene camera for taking field images of a field of view of the user wearing the head-wearable device, for example as respective video streams, more typically in addition a second eye camera for taking second (eye) images of at least a portion of a second eye of the user wearing the head-wearable device. A computing and control unit of the eye tracking system 900 is configured to control displaying the not translatory movement of the object, to receive from the eye camera(s) respective eye images and from the scene camera corresponding field images, and at least one of: to instruct the user to look at the object and mimic the not translatory movement, to use the field images to determine for the eye images respective ground truth values of gaze-direction related parameter(s) of the user, to generate datasets, each dataset including one of the eye images, typically a corresponding pair of first and second eye images (taken at substantially the same time) and optionally a ground truth value of the gaze-direction related parameter(s) corresponding to the eye image(s) of the dataset and/or a respective field image of the user (taken at substantially the same time as the eye images), and to upload the datasets to a computing system 910, such as a (remote) server or cloud based structure, configured to host a first database for the datasets.

The computing and control unit is typically further configured to use the eye images to determine respective predicted values for the gaze-direction related parameter(s), to use the ground truth values and the predicted values of the gaze-direction related parameter(s) to determine a correction function for the user, to store the correction function for the user, and to use the correction function to correct the predicted values of the gaze-direction related parameter(s) of the user.

The computing and control unit may be provided by a control and/or processing unit of the head-wearable device and/or by a control and/or processing unit of the companion device.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Such modifications to the inventive concept are intended to be covered by the appended claims.

While processes may be depicted in the figures in a particular order, this should not be understood as requiring, if not stated otherwise, that such operations have to be performed in the particular order shown or in sequential order to achieve the desirable results. In certain circumstances, multitasking and/or parallel processing may be advantageous.

Spatially relative terms such as "under", "below", "lower", "over", "upper" and the like are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

REFERENCE NUMBERS 1 spectacles device
2 spectacles body
3 nose bridge portion
4 frame
5 illumination means
6 scene camera
7 processing unit
8 first (inner) part of the spectacles body
9 second (outer) part of the spectacles body
10 left side
11 left ocular opening
12 left lateral portion
13 left holder/left temple (arm)
14 left camera
15 optical axis (left camera)
16
17 left inner eye camera placement zone
18 left outer eye camera placement zone
19 left eye
20 right side
21 right ocular opening
22 right lateral portion
23 right holder/right temple (arm)
24 right camera
25 optical axis (right camera)
26
27 right inner eye camera placement zone
28 left outer eye camera placement zone
29 right eye
30 bounding cuboid
31 left lateral surface
32 right lateral surface
33 upper surface
34 lower surface
90 user
91 displayed object, head, avatar
$\alpha''$, $\beta''$, $\gamma''$ angles of rotation of displayed object
100 middle plane
101 horizontal direction
102 vertical direction
103 down
104 up
105 front
106 back
$\alpha$ angle of inner left camera 14
$\beta$ angle of inner right camera 24
$\gamma$ angle of outer left camera 14
$\delta$ angle of outer right camera 24
500-502 system
510 computing system/server
520, 530 head-wearable spectacles device
525, 535 processing unit
600, 700, 900 system
610, 710, 910 computing system/server/cloud
620, 720, 901 head wearable device, head wearable spectacles device
625, 725 processing unit/controller of head wearable spectacles device
627 companion device/smartphone
7251 CNN-module
801 spectacles device
806 removable scene camera
808 magnets
809 magnets
813 left holder
823 right holder
860 connector, socket
861 connector, plug
807 processing unit: 872-876
870 USB-connector, USB-C receptacle
871 flex connector/flex circuit cable
872 USB hub board with power IC, IMU and additional micro-controller
873 flex connector(s), (flex PCB) connecting cable(s)
874 right eye camera controller board
876 left eye camera controller board
925 processing unit of companion device
926 screen/display of companion device/smartphone
927 companion device/smartphone
>=1000 methods, method steps

The invention claimed is:

1. A method for generating data suitable for calibrating a head-wearable device comprising a first eye camera and a scene camera, the method comprising:
   displaying a not translatory movement of an object on a display;
   using the scene camera to generate field images of a field of view of the user wearing the head-wearable device and being instructed to look at the object and mimic the not translatory movement, and using the first eye camera to generate first images of at least a portion of a first eye of the user while the user is expected to look at the object and mimic the not translatory movement;
   determining respective positions of the object in the field images; and
   using the determined positions of the object to determine for the first images respective ground truth values of at least one gaze-direction related parameter of the user.

2. The method of claim 1, further comprising instructing the user to mimic with their head the movements of the displayed object and/or to look at a particular landmark of the displayed object.

3. The method of claim 1, wherein determining the ground truth values comprises at least one of:
   calculating respective ground truth values using the field images based on object recognition or localization techniques;
   performing a validity check for the calculated ground truth values;
   discarding calculated ground truth values not fulfilling the validity check;
   fitting and/or interpolating the calculated ground truth values; and
   allocating the calculated ground truth values or the fitted and/or interpolated calculated ground truth values of the at least one gaze-direction related parameter to a respective first image.

4. The method of claim 1, prior to generating the field images and the first images comprising connecting the head-wearable device with a companion device comprising the display.

5. The method of claim 4, wherein the head-wearable device and the companion device are connected by means of a wired connection, in particular a USB-connection.

6. The method of claim 5, comprising supplying the head-wearable device with electric power via the wired connection.

7. The method of claim 1, wherein the respective ground truth values of the at least one gaze-direction related parameter are determined by a control or processing unit of the head-wearable device or by a control or processing unit of the companion device or by a processing unit of a remote computing system.

8. The method of claim 1, wherein the head-wearable device comprises a second eye camera, wherein the second eye camera is used to generate second images of at least a portion of a second eye of the user while the user is expected to look at the object and mimic the not translatory movement.

9. The method of claim 8, wherein the first and second images are generated synchronously, and wherein each second image is allocated to a respective first image.

10. The method of claim 8, further comprising at least one of:
    establishing a data connection between the head-wearable device or the companion device and a computing system configured to host a first database;
    generating datasets, each dataset comprising one of the first eye images, a corresponding one of the second eye images and a corresponding ground truth value of the at least one gaze-direction related parameter of the user and/or a respective field image; and
    adding the datasets to the first database.

11. The method of claim 1, wherein the at least one gaze-direction related parameter is selected from a list consisting of: a gaze direction, a cyclopean gaze direction, a 3D gaze point, a 2D gaze point, a visual axis orientation, an optical axis orientation, a pupil axis orientation, and a line of sight orientation.

12. The method of claim 1, wherein the not translatory movement comprises a rotational movement about an axis which is at least substantially centred with respect to the object, wherein an angle of the rotational movement varies, wherein the displayed not translatory movement corresponds to a projection of the rotational movement, wherein an angle of rotation of the rotational movement is a differentiable function of time, wherein the rotational movement is performed step-wise in time, wherein the not translatory movement comprises a sequence of rotational movements, wherein the sequence of rotational movements comprises rotational movements about at least two different axes wherein the sequence of rotational movements is randomized, wherein the object comprises two eyes and/or is a representation of a face or a head, wherein respective centers of pupils of the eyes of the object substantially do not move on the display during the not translatory movement of the object, and/or wherein the eyes of the object keeps looking in one direction.

13. The method of claim 1, further comprising at least one of:
    processing at least one of the first images and the second images for determining a respective predicted value of the at least one gaze-related parameter;
    processing at least one of the first images and the second images using a trained neural network, wherein respective pairs of first and second images are used as inputs for the trained neural network;
    uploading the trained neural network from the computing system to the head-wearable device or the companion device;
    unsupervised performing of the method;
    performing the method several times;
    determining one or more additional gaze-related parameters of the user;
    comparing the calculated ground truth values and the predicted values of the at least one gaze-direction related parameter to determine at least one outlier;
    determining a first correlation measure between the predicted values of the at least one gaze-direction related parameter and the determined positions of the object in the field images or the calculated ground truth values;
    determining a second correlation measure between rotational angles of the object and corresponding determined positions of the object in the field images or corresponding calculated ground truth values;
    determining a third correlation measure between rotational angles of the object and corresponding predicted values of the gaze-direction related parameter;
    determining a fourth correlation measure between rotational angles of the object and data of an inertial measurement unit of the head-wearable device;
    monitoring movements of the head of the user;
    using the monitored movements as a feed-back signal for the not translatory movement of the displayed object;

using the determined respective positions of the object in the field images and/or data of an inertial measurement unit of the head-wearable device; determining whether the movements of the user's head are out of an expected range; and indicating explicitly or implicitly to the user when the movements of the user's head are determined to be out of the expected range.

14. The method of claim 13, further comprising at least one of:

using the ground truth values and the predicted values of the gaze-direction related parameter to determine a correction function for the user, using the correction function to correct the predicted values of the gaze-direction related parameter;

determining a residual error between the corrected predicted values and the calculated ground truth values;

discarding the calculated ground truth values if the determined residual error is above a given threshold; and repeating the method if the determined residual error is above the given threshold.

15. The method of claim 13, wherein the feed-back signal causes the not translatory movement of the displayed object to be sped up, slowed down or even paused when the head of the user is moving slower or faster than expected, wherein the feed-back signal causes increasing an rotational angle of the not translatory movement when the head of the user is moving too little while mimicking the not translatory movement, and/or wherein the feed-back signal causes decreasing a rotational angle of the not translatory movement when the head of the user is moving too much or too far while mimicking the not translatory movement.

16. The method of claim 1, further comprising at least one of:

establishing a data connection between a computing system configured to host a first database and the head-wearable device or a companion device connected to the head-wearable device;

adding the datasets to the first database;

using the datasets for calibrating the head-wearable device;

using the first images and the ground truth values for calibrating the head-wearable device;

discarding the calculated ground truth values if at least one of the determined correlation measures is below a respective given threshold and/or if an outlier has been detected;

repeating the method if some or all calculated ground truth values are discarded; and using only calculated ground truth values which have not been discarded for performing the calibration.

17. A method for generating data suitable for calibrating a head-wearable device comprising a first eye camera and a scene camera, the method comprising:

displaying a not translatory movement of an object on a display;

instructing a user wearing the head-wearable device to look at the object and mimic the not translatory movement; and using the first eye camera to generate first images of at least a portion of a first eye of the user while the user is expected to look at the object and mimic the not translatory movement;

generating datasets, each dataset comprising one of the first eye images and at least one of a corresponding ground truth value of at least one gaze-direction related parameter of the user and a respective field image of a field of view of the user wearing the head-wearable device, the field images being generated using the scene camera while the user is expected to look at the object and mimic the not translatory movement, wherein the not translatory movement of the object is performed so that several values of the at least one gaze-related parameter of the user are encoded in the first images.

18. The method of claim 17, wherein the several values of at least one gaze-related parameter cover a representative range, and/or wherein the at least one gaze-related parameter is a gaze-direction related parameter or selected from a list consisting of: a position and/or an eyelid closure, a pupil area, a pupil size, a pupil diameter, a sclera characteristic, an iris diameter, a characteristic of a blood vessel, a cornea characteristic of at least one eye, a cornea radius, an eyeball radius, a distance pupil-center to cornea-center, a distance cornea-center to eyeball-center, a distance pupil-center to limbus center, a cornea keratometric index of refraction, a cornea index of refraction, a vitreous humor index of refraction, a distance crystalline lens to eyeball-center, to cornea center and/or to corneal apex, a crystalline lens index of refraction, a degree of astigmatism, an orientation angle of a flat and/or a steep axis, a limbus major and/or minor axes orientation, an eye cyclo-torsion, an eye intra-ocular distance, an eye vergence, a statistics over eye adduction and/or eye abduction, and a statistics over eye elevation and/or eye depression, data about blink events, drowsiness and/or awareness of the user, parameters for user iris verification and/or identification.

19. An eye tracking system comprising:

a head-wearable device comprising a first eye camera and a scene camera;

a companion device connectable with the head-wearable device and comprising a display; and a computing and control unit configured to:

control displaying a not translatory movement of an object on the display;

receive from the first eye camera first images of at least a portion of a first eye of a user wearing the head-wearable device and from the scene camera corresponding field images of a field of view of the user; and at least one of:

instruct the user to look at the object and mimic the not translatory movement;

use the field images to determine for the first images respective ground truth values of at least one gaze-direction related parameter of the user;

generate datasets, each dataset comprising one of the first eye images and a corresponding ground truth value of the at least one gaze-direction related parameter of the user and/or a respective field image of the user wearing the head-wearable device, the images being generated using the cameras of the head-wearable device while the user is expected to look at the object and mimic the not translatory movement; and upload the datasets to a computing system configured to host a first database for the datasets via a data connection between the computing system and the head-wearable device or a companion device connected to the head-wearable device.

20. The eye tracking system of claim 19, wherein the computing and control unit is configured to use the first images to determine respective predicted values for the at least one gaze-direction related parameter, to use the ground truth values and the predicted values of the at least one gaze-direction related parameter to determine a correction function for the user, to store the correction function for the user, and/or to use the correction function to correct the predicted values of the at least one gaze-direction related parameter, wherein the companion device is a mobile computing device, wherein the computing and control unit comprises a hardware component particularly designed for running a neural network instance, and/or wherein the computing and control unit is provided by a control and/or processing unit of the head-wearable device and/or by a control and/or processing unit of the companion device, wherein the head-wearable device comprises a second eye camera for taking second images of at least a portion of a second eye of the user while the user is wearing the head-wearable device, wherein the head-wearable device is a spectacles device, and/or wherein the computing and control unit is configured to generate datasets, each dataset comprising a pair of corresponding first and second eye images and a respective ground truth value of the at least one gaze-direction related parameter of the user and/or a respective field image.

* * * * *